US011912439B2

(12) United States Patent
Saint-Antonin

(10) Patent No.: US 11,912,439 B2
(45) Date of Patent: Feb. 27, 2024

(54) SATELLITE CONTROL APPARATUSES AND METHODS

(71) Applicant: AIRBUS ONEWEB SATELLITES SAS, Toulouse (FR)

(72) Inventor: Laurent Saint-Antonin, Bélesta-en-Lauragais (FR)

(73) Assignee: AIRBUS ONEWEB SATELLITES SAS, Toulouse (FR)

( * ) Notice: Subject to any disclaimer, the term of this patent is extended or adjusted under 35 U.S.C. 154(b) by 404 days.

(21) Appl. No.: 17/254,286

(22) PCT Filed: Jun. 20, 2019

(86) PCT No.: PCT/EP2019/066354
§ 371 (c)(1),
(2) Date: Dec. 20, 2020

(87) PCT Pub. No.: WO2019/243500
PCT Pub. Date: Dec. 26, 2019

(65) Prior Publication Data
US 2021/0269176 A1     Sep. 2, 2021

(30) Foreign Application Priority Data
Jun. 21, 2018   (EP) ...................................... 18305787

(51) Int. Cl.
*B64G 1/24*     (2006.01)
(52) U.S. Cl.
CPC ................ *B64G 1/24* (2013.01); *B64G 1/247* (2023.08)
(58) Field of Classification Search
CPC ....... B64C 39/024; B64C 39/02; B64C 27/08; B64C 19/00; B64C 13/18; B64C 29/0025;
(Continued)

(56) References Cited

U.S. PATENT DOCUMENTS 5,271,582 A * 12/1993 Perkins .................. B64G 1/641
244/159.4
5,452,869 A *  9/1995 Basuthakur ............ B64G 1/288
701/13
(Continued)

FOREIGN PATENT DOCUMENTS

WO     2017134689 A2     8/2017

OTHER PUBLICATIONS

International Search Report and Written Opinion issued by the European Patent Office as ISA dated Sep. 20, 2019 in PCT/EP2019/0663545.

*Primary Examiner* — Maceeh Anwari
*Assistant Examiner* — Aarron E Santos
(74) *Attorney, Agent, or Firm* — The Culbertson Group, P.C.; Russell D. Culbertson

(57) ABSTRACT

An artificial satellite comprises a satellite structure, an onboard control system including an onboard controller, and a memory system. The memory system is physically coupled to the satellite structure and independently powerable with respect to the onboard controller. The memory system is also arranged to communicatively couple with the onboard controller, and to store data which specifies one or more launch-specific parameters for configuring at least one of the satellite components. The onboard control system is adapted to operate in a transfer phase in response to the satellite separating from a payload dispenser, and to autonomously control, while operating in the transfer phase, one or more aspects of at least one satellite component at least partly based on the data, and particularly the one or more launch-specific parameters specified by or derived from the data.

20 Claims, 11 Drawing Sheets

(58) Field of Classification Search
CPC ... B64C 29/0033; B64C 39/022; B64C 17/02; B64C 2211/00; B64C 27/006; B64C 27/06; B64C 27/57; B64C 29/0058; B64C 39/08; B64C 1/26; B64C 13/20; B64C 13/503; B64C 27/00; B64C 27/04; B64C 27/14; B64C 3/56; B64C 13/04; B64C 13/0423; B64C 13/0427; B64C 13/22; B64C 25/10; B64C 25/52; B64C 27/12; B64C 27/26; B64C 27/30; B64C 31/02; B64C 39/04; B64C 9/02; B64C 1/28; B64C 1/32; B64C 11/18; B64C 11/22; B64C 11/26; B64C 11/28; B64C 11/48; B64C 13/505; B64C 27/28; B64C 27/473; B64C 27/52; B64C 27/56; B64C 29/02; B64C 39/12; B64C 5/04; B64C 1/00; B64C 1/30; B64C 1/36; B64C 11/001; B64C 11/44; B64C 21/00; B64C 2203/00; B64C 2230/02; B64C 23/005; B64C 23/08; B64C 25/405; B64C 25/42; B64C 25/50; B64C 27/02; B64C 27/10; B64C 27/16; B64C 29/00; B64C 29/0008; B64C 29/0016; B64C 29/04; B64C 37/02; B64C 39/00; B64C 39/001; B64U 2101/30; B64U 2201/20; B64U 2201/10; B64U 2101/60; B64U 10/13; B64U 30/20; B64U 50/19; B64U 2101/00; B64U 50/34; B64U 70/00; B64U 2201/202; B64U 2201/104; B64U 70/80; B64U 10/00; B64U 10/25; B64U 2201/00; B64U 30/10; B64U 10/10; B64U 50/15; B64U 30/12; B64U 70/20; B64U 80/82; B64U 50/11; B64U 50/13; B64U 70/30; B64U 70/60; B64U 80/00; B64U 20/10; B64U 2101/15; B64U 2101/20; B64U 80/70; B64G 1/1078; B64G 4/00; B64G 1/646; B64G 1/402; B64G 1/222; B64G 2004/005; B64G 1/405; B64G 1/64; B64G 3/00; B64G 1/00; B64G 1/14; B64G 1/32; B64G 1/36; B64G 1/44; B64G 1/1007; B64G 1/1085; B64G 1/242; B64G 1/244; B64G 1/281; B64G 1/361; B64G 1/363; B64G 1/365; B64G 1/26; B64G 1/285; B64G 1/366; B64G 1/443; B64G 2001/245; B64G 2001/247; B64G 1/002; B64G 1/10; B64G 1/1021; B64G 1/401; B64G 1/403; B64G 1/404; B64G 1/428; B64G 1/50; B64G 5/00

See application file for complete search history.

(56) References Cited

U.S. PATENT DOCUMENTS

| | | | |
|---|---|---|---|
| 6,157,621 A * | 12/2000 | Brown | H01Q 15/02 370/310 |
| 8,888,050 B1 | 11/2014 | Murphy | |
| 2003/0033067 A1* | 2/2003 | Arita | B60R 16/0315 701/1 |
| 2006/0146771 A1* | 7/2006 | Wietzke | H04M 1/72403 370/338 |
| 2007/0233430 A1* | 10/2007 | Singh | G06F 11/30 702/187 |
| 2012/0261515 A1* | 10/2012 | Smith | B64G 1/64 244/173.3 |
| 2013/0119204 A1* | 5/2013 | Allen | B64G 1/646 244/172.5 |
| 2016/0009425 A1* | 1/2016 | Thompson | B64G 1/242 244/158.5 |
| 2016/0306412 A1* | 10/2016 | Kolla | G06F 1/3287 |
| 2017/0006224 A1* | 1/2017 | Kim | H04N 25/70 |

* cited by examiner

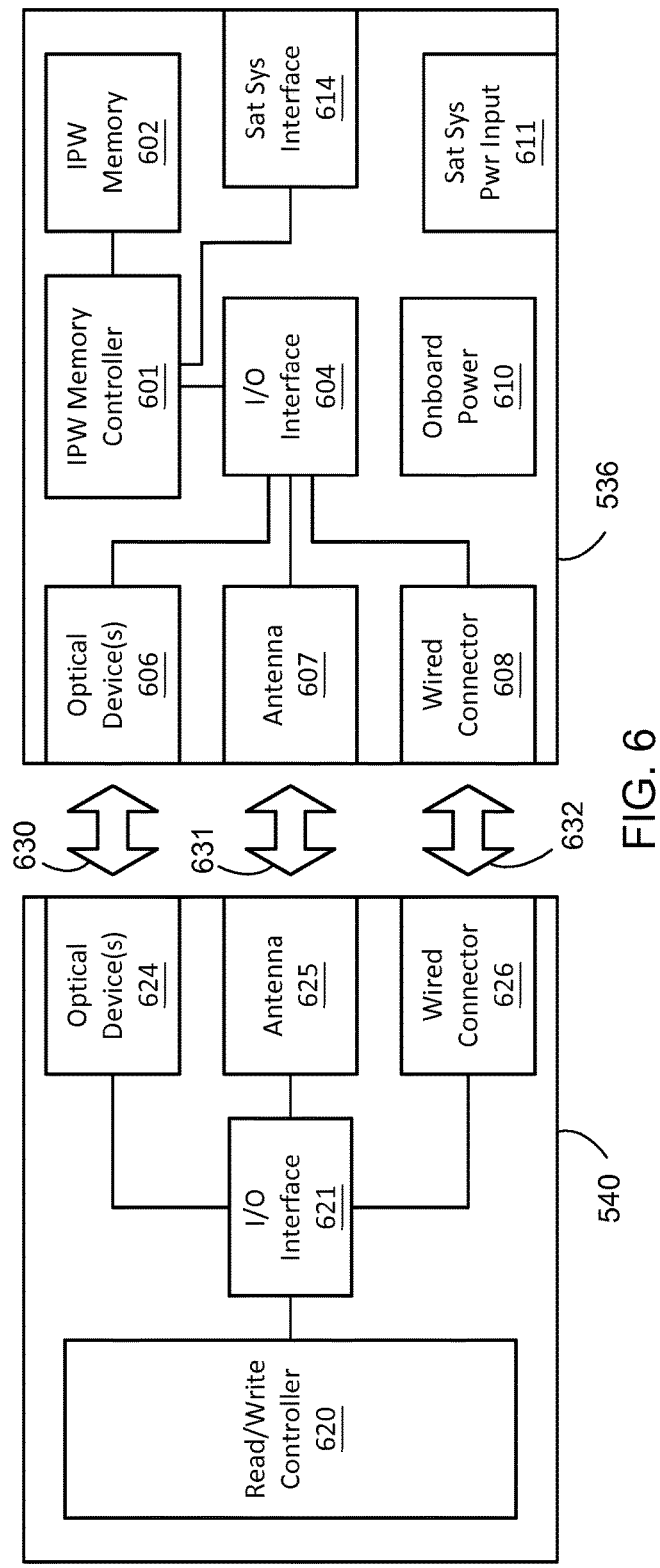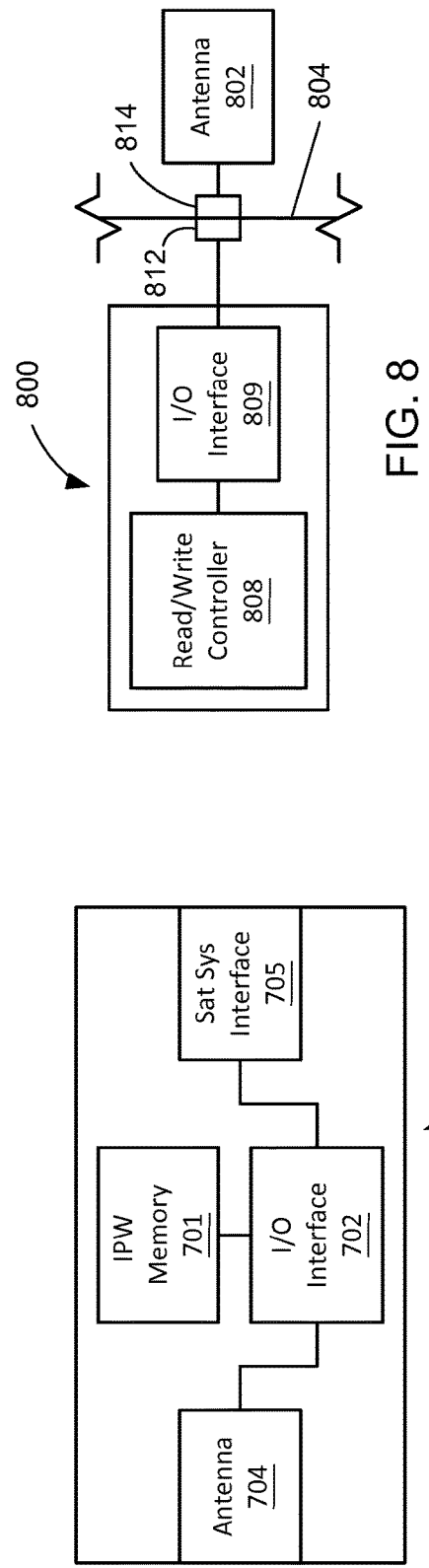

SATELLITE CONTROL APPARATUSES AND METHODS

TECHNICAL FIELD OF THE INVENTION

The invention relates to methods and apparatuses for facilitating autonomous control of one or more aspects of an artificial satellite.

BACKGROUND

Autonomous and semi-autonomous satellite operations generally require a real or near-real time provision and calculation of control data using exclusively onboard avionic resources. Typical control procedures include RF Tx/Rx scheduling, data allocation, attitude and orbit control in both nominal and non-nominal cases, failure detection, and isolation and recovery.

Autonomous satellite operations are sometimes required because of the nature of the mission itself. For example, a given mission may require launching a satellite in a "powered-off" state. In this state, power is limited (if applied at all) to only certain components of the satellite such as a satellite's essential bus electronics. For example, power may be limited to heaters and a Power Control and Distribution Unit (PCDU), among other possible essential components during launch for performing satellite survival activities (e.g., active thermal control). In contrast, an attitude and/or orbit control system (AOCS) of a satellite is typically unpowered or OFF during the "launch phase".

The launch phase is typically the satellite's operational phase during the launch of the launch vehicle carrying the satellite, but before the satellite's separation from the launch vehicle's payload dispenser (e.g., released in free space). Separation from the payload dispenser typically triggers a "transfer phase", during which the satellite transitions from the launch phase to a "deployment phase" and/or "mission phase".

Transfer phase autonomous procedures may be trigged by the satellite separating from a launch dispenser. For example, the separation of a satellite from a payload dispenser of the launch vehicle may cause one or more mechanical and/or electrical switches of the satellite to change states for detecting said separation. After separation detection, one or more onboard controllers boot-up and conduct further autonomous operations.

For example, an AOCS of a satellite may perform autonomous operations during the transfer phase via software-based control instructions after separation detection. During this phase, the AOCS dampens the initial launch vehicle separation spin rates, acquires an attitude with positive power balance (Sun acquisition) and, may perform a series of orbital maneuvers to reach a target orbit.

For earth-oriented missions, typical onboard resources for autonomous procedures include the GNSS (Global Navigation Satellite Systems) services provided by existing systems such as GPS or Glonass and telecommand data. However, such resources are not available when initiating a satellite launched in an OFF state and thus is not emitting or receiving RF-spectrum signals (for example, during at least a portion of the transfer phase). After the transfer phase, the deployment and mission phases may receive and process telecommands (e.g., ground-based signals), fully utilize avionics (e.g., a coarse Suns sensor, gyroscopes, magnetorquers), and access GNSS-based data for various satellite operations, whereas the transfer phase cannot, at least initially, utilize such resources.

SUMMARY OF THE INVENTION

It is an object of the invention is to perform autonomous operations during the transition of a satellite from launch-vehicle detachment to mission state.

As used herein, "satellite control system" and "onboard control system" refer to a control system that is physically arranged on and/or within a satellite and said terms are used interchangeably. Similarly, "satellite" and "artificial satellite" both refer to man-made (or possibly extraterrestrial-made) artificial satellites and said terms are also used interchangeably.

According to a first aspect of the invention, an artificial satellite includes a satellite structure, an onboard control system for controlling a plurality of satellite components, and a memory system. The memory system is physically coupled to the satellite structure and is independently powerable with respect to the onboard control system and thereby operable to at least receive and store information even when the onboard control system is in an OFF or other non-communicative state (e.g., an idle state). The memory system is arranged to communicatively couple with the onboard control system, and stores data which specifies one or more launch-specific parameters for configuring at least one of the satellite components.

The onboard control system is adapted to operate in a transfer phase in response to the satellite separating from a payload dispenser. The onboard control system is further adapted to autonomously control, while operating in the transfer phase, one or more aspects of the at least one satellite component at least partly based on the data.

In a first possible implementation according to the first aspect, the artificial satellite further comprises a data exchange interface on or near a peripheral section of the artificial satellite, with the data exchange interface being for communicating with an external communication device.

In a second possible implementation according to the first implementation, the memory system is further arranged to communicatively couple with the external communication device via the data exchange interface.

In a third possible implementation according to the first or second implementations, the data exchange interface includes an inter-satellite communication link, and the memory system is communicatively coupled to the inter-satellite communication link.

In a fourth possible implementation according to the first aspect or any of the above implementations, the onboard control system is adapted to cause, while operating in the transfer phase, the memory system to transmit the launch-specific parameters.

In a fifth possible implementation according to the first aspect or any of the above implementations, the onboard control system, while operating in the transfer phase, is adapted to autonomously control a physical orientation of the at least one satellite component at least partly based on the data.

In a sixth possible implementation according to the first aspect or any of the above implementations, the onboard control system, while operating in the transfer phase, is adapted to autonomously control a physical orientation of the artificial satellite at least partly based on the data.

In a seventh possible implementation according to the first aspect or any of the above implementations, the onboard control system, while operating in the transfer phase, is adapted to autonomously perform time-contingent transfer phase functionalities at least partly based on a time value directly or indirectly specified by the data.

In an eighth possible implementation according to the first aspect or any of the above implementations, the launch-specific parameters include time parameters of different temporal resolutions.

In a ninth possible implementation according to the first aspect or any of the above implementations, the satellite structure includes at least one of a structural wall, a structural bracket, a structural rib, a circuit substrate, and a cable.

In a tenth possible implementation according to the first aspect or any of the above implementations, the plurality of satellite components includes at least one of a solar array, an antenna, a magnetorquer, a propulsion thruster, an actuator, and a reprogrammable controller.

In an eleventh possible implementation according to the first aspect or any of the above implementations, the launch-specific parameters characterize at least one of a target antenna orientation, a target solar-array orientation, a target satellite attitude, a satellite launch orientation, a predicted satellite spin rate, a predicted satellite spin axis orientation, a satellite launch position on the payload dispenser, a satellite separation time from the payload dispenser, a satellite relative separation order from the payload dispenser, a target orbital state vector, a target semi-major axis, a target eccentricity, a target right ascension of ascending mode, a target argument of perigee, a target orbit, a target orbital plane, a target orbital position in the target orbital plane, a launch date, and a launch time.

In a twelfth possible implementation according to the first aspect or any of the above implementations, the memory system includes a first computer-readable memory that is communicatively coupled to a first antenna that is arranged at a first location, the first computer-readable memory storing at least the launch-specific parameters, and the onboard control system includes a second antenna for communicatively coupling with the memory system through the first antenna, the second antenna arranged at a second location, the first and second antennas arranged within an operative communication distance from each other.

In a thirteenth possible implementation according to the twelfth implementation, the second antenna is located on a section of a circuit substrate of the onboard control system.

In a fourteenth possible implementation according to the twelfth or thirteenth implementations, the second antenna is arranged in or on a portion of an integrated circuit package of a controller included in the onboard control system.

In a fifteenth possible implementation according to any of the twelfth through fourteenth implementations, the onboard control system is adapted to wirelessly power the memory system.

In a sixteenth possible implementation according to any of the twelfth through fifteenth implementations, the satellite comprises a wall that defines a peripheral boundary of the satellite, and the distance between a first portion of the wall and the first antenna is arranged within the operative communication distance such that a data writing device can wirelessly communicate with the memory system when an antenna of the data writing device is positioned at the first portion of the wall.

In a seventeenth possible implementation according to any of the twelfth through sixteenth implementations, the first computer-readable memory is arranged at a first side of the satellite structure and the first antenna is arranged at a second side of the satellite structure, the first and second sides differing.

In an eighteenth possible implementation according to the seventeenth implementation, the first side is an exterior-facing side of the satellite and the second side is an interior-facing side of the satellite.

According to a second aspect of the invention, a satellite system includes an artificial satellite according to the first aspect or any of the above implementations thereof and an external communication device. At least a portion of the external communication device may be mounted remotely from the satellite structure. The external communication device is adapted to communicatively couple with the memory system and write to the memory system data that specifies one or more launch-specific parameters for configuring at least one of the satellite components.

In a first possible implementation according to the second aspect, the artificial satellite includes a data exchange interface on the satellite structure, and the external communication device communicatively couples to the memory system through the data exchange interface.

In a second possible implementation according to the first implementation of the second aspect, the data exchange interface includes an inter-satellite communication link, and the memory system is communicatively coupled to the inter-satellite communication link.

In a third possible implementation according to the second aspect or any of the above implementations thereof, the external communication device includes a first wireless transmitter, and the memory system includes a first computer-readable memory that is communicatively coupled to a first wireless receiver. The memory system is adapted to store the data in the first computer-readable memory in response to a transmission of the data from the first wireless transmitter.

In a fourth possible implementation according to the third implementation, the first wireless transmitter is adapted to wirelessly power the memory system.

In a fifth possible implementation according to the third implementation, the first wireless transmitter is mounted on the satellite structure and includes a detachable connection to a connector of the external communication device.

In a sixth possible implementation according to the third implementation, the first wireless transmitter is mounted on a probe of the external communication device and the satellite structure includes a receiver for receiving the probe so that the probe extends into an interior area of the satellite structure.

In a seventh possible implementation according to the second aspect or the first or second implementations thereof, the external communication device includes a first wired connector, and the memory system includes a first computer-readable memory that is communicatively coupled to a second wired connector adapted to make an operative connection with the first wired connector. The memory system being adapted to store the data in the first computer-readable memory in response to a communication of the data across the operative connection.

According to a third aspect of the invention, a method of deploying a satellite includes arranging the satellite in a stowed position on a satellite deployment system, the satellite being in a launch condition in which an onboard control system of the satellite is in an off state. With the satellite in the stowed position and launch condition, the method further includes communicatively coupling to a memory system of the satellite, the memory system being powered independently of the onboard control system of the satellite. With the satellite in the stowed position and launch condition, the method further includes writing to the memory system of the satellite data which specifies one or more launch-specific parameters for configuring at least one component of the satellite.

In a first possible implementation according to the third aspect, with the satellite in the stowed position, the method includes a data exchange interface communicatively coupled to the memory system of the satellite being accessible from an exterior of the deployment system.

In a second possible implementation according to the third aspect or first implementation thereof, the method includes communicatively coupling to the memory system of the satellite by placing an antenna of a memory system writing device in an operative position with respect to an antenna of the memory system of the satellite.

In a third possible implementation according to the third aspect or first implementation thereof, the method includes communicatively coupling to the memory system of the satellite by placing an optical transmitter of a memory system writing device in an operative position with respect to an optical receiver of the memory system of the satellite.

In a fourth possible implementation according to the third aspect or first implementation thereof, the method includes communicatively coupling to the memory system of the satellite by connecting a connector of a memory system writing device to a connector of the memory system of the satellite.

In a fifth possible implementation according to the third aspect or first or second implementations thereof, the method includes communicatively coupling to the memory system of the satellite by placing an antenna of a memory system writing device adjacent to a graphic target on the satellite.

In a sixth possible implementation according to the third aspect or first through third implementations thereof, the method includes communicatively coupling to the memory system of the satellite by placing a probe of the memory system writing device in a receptacle formed in an enclosure of the satellite.

In a seventh possible implementation according to the third aspect or first through third implementations or fifth or sixth implementations, the method includes communicatively coupling to the memory system of the satellite by wirelessly powering the memory system via the memory system writing device in the operative position.

In an eighth possible implementation according to the third aspect or any implementation thereof, the method includes, after launch of the satellite deployment system, transmitting the data from the memory system of the satellite to the onboard control system, and while the satellite is operating in a transfer phase, autonomously controlling, via the onboard control system, a physical orientation of at least one satellite component or the satellite at least partly based on the launch-specific parameters.

In a ninth possible implementation according to the third aspect or any implementation thereof, the method includes, after launch of the satellite deployment system, transmitting the data from the memory system of the satellite to the onboard control system, and while the satellite is operating in a transfer phase, autonomously performing, via the onboard control system, time-contingent transfer phase functionalities at least partly based on a time value directly or indirectly specified by the data.

In a tenth possible implementation according to the third aspect or any implementation thereof, the method includes wirelessly transmitting the data from the memory system of the satellite to the onboard control system. Wireless transmissions may include utilizing RF signaling.

In an eleventh possible implementation according to the tenth implementation, the method includes wirelessly powering, via the onboard control system, the memory system of the satellite.

In a twelfth possible implementation according to the third aspect or any implementation thereof, the method further includes arranging at least one additional satellite in a respective stowed position on a satellite deployment system, the at least one additional satellite being in a launch condition for that satellite in which an onboard control system of the at least one satellite is in a respective OFF state. With the at least one additional satellite in the respective stowed position and launch condition, the method further includes communicatively coupling to a memory system of the at least one additional satellite, the memory system being powered independently of the onboard control system of the at least one additional satellite. The method further includes, with the at least one additional satellite in the respective stowed position and launch condition, writing to the memory system of the at least one additional satellite data which specifies one or more launch-specific parameters for configuring at least one component of the at least additional satellite.

In a thirteenth possible implementation according to the twelfth implementation, the step of writing to the memory systems of the satellite and the at least one additional satellite includes writing, at least partially concurrently in time, to at least both the memory systems of the satellite and the at least one additional satellite. This step may include writing, concurrently, to at least both the memory systems of the satellite and the at least one additional satellite.

These and other advantages and features of the invention will be apparent from the following description of representative embodiments, considered along with the accompanying drawings.

BRIEF DESCRIPTION OF THE DRAWINGS

FIG. 6 is a schematic representation of an example IPW memory system reader/writer and IPW memory system.

FIG. 7 is a schematic representation of an alternative, remotely powered IPW memory system within the scope of the present invention.

FIG. 8 is a schematic representation of an alternative IPW memory system reader/writer having a wireless communication antenna positioned within a satellite enclosure.

DESCRIPTION OF REPRESENTATIVE EMBODIMENTS

Figure 1:
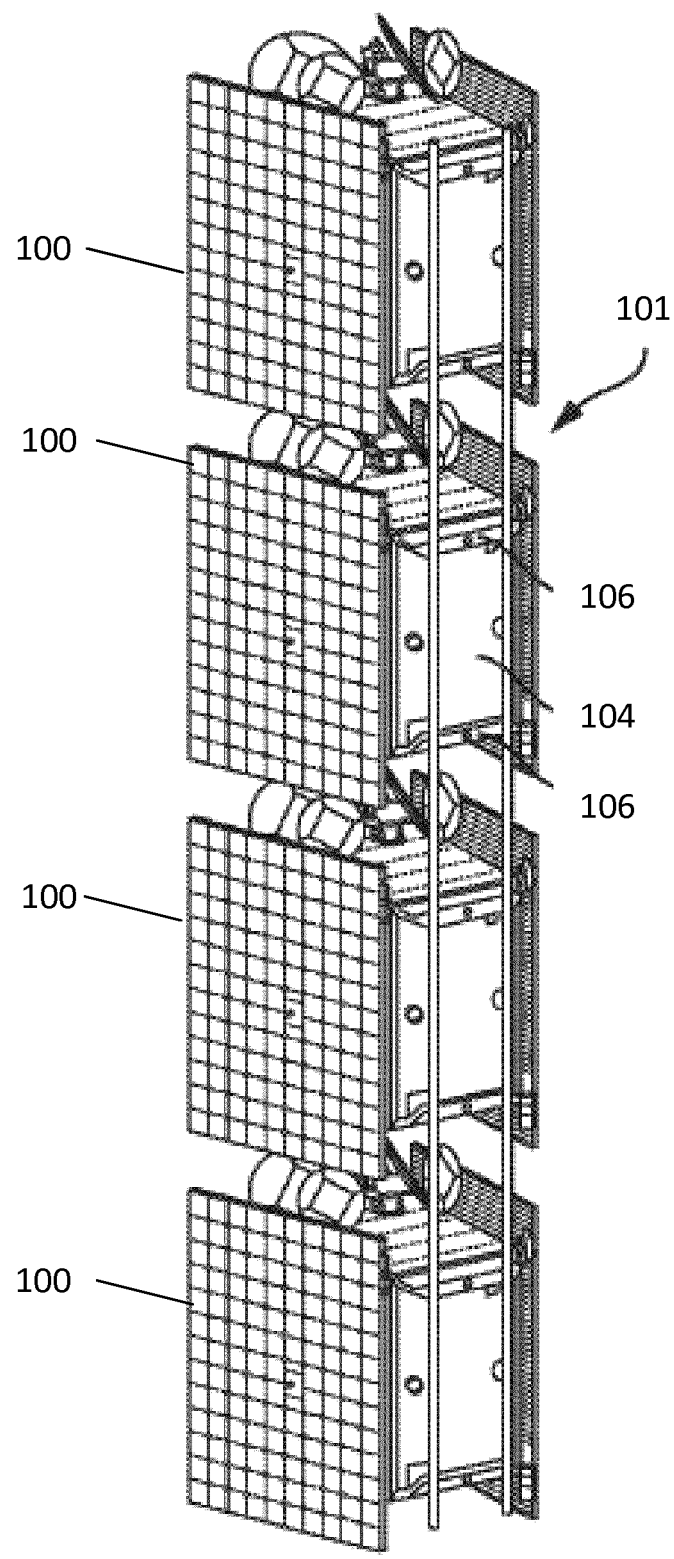
FIG. 1 is a perspective view of a portion of a satellite deployment system which may be used to deploy satellites embodying the principles of the present invention.
Figure 3:
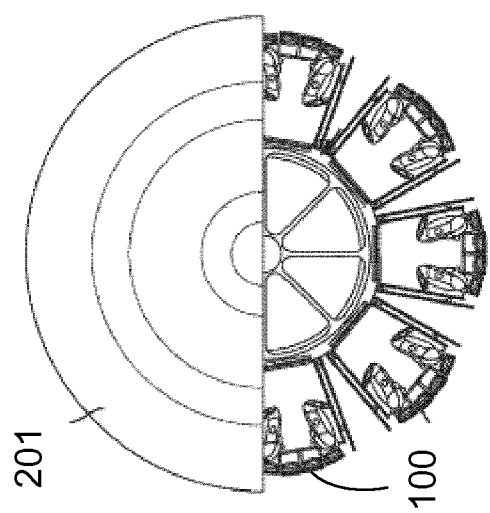
FIG. 3 is a top view of the launch vehicle and satellite deployment system shown in FIG. 2.
Figure 2:
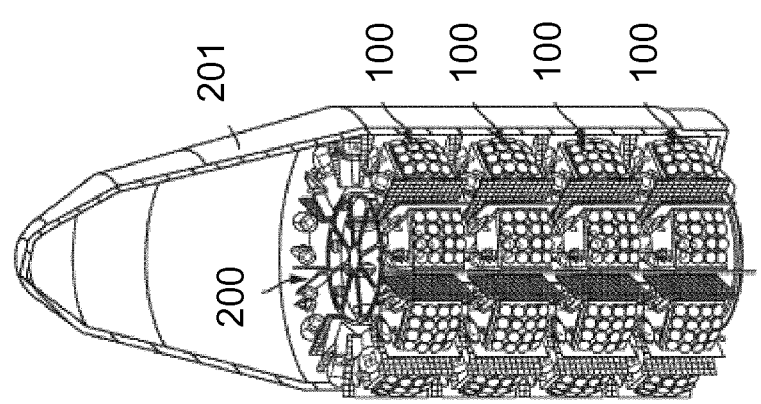
FIG. 2 is a partially broken away perspective view of a launch vehicle in which may carry a satellite deployment system for deploying satellites according to aspects of the present invention.

FIGS. 1-3 show portions of a satellite deployment system which may be used to deploy satellites according to aspects of the present invention. These particular figures show a satellite deployment system which is the subject of U.S. Pat. Pub. No. 2016/0368625. Of course, the present invention is compatible with other dispensing techniques and apparatus for launching multiple satellites or single satellites.

FIG. 1 shows four satellites 100 attached to a rail assembly shown generally at 101. A respective panel 104 of each satellite 100 couples to respective paired couplings 106 of rail assembly 101.

FIGS. 2 and 3 provide, respectively, perspective and top views of a payload dispenser 200 housed within a fairing 201 and including nine satellite-laden rail assemblies each corresponding to assembly 101 shown in FIG. 1. The rail assemblies in FIGS. 2 and 3 are not called out in either FIG. 2 or 3 due to the scale and orientation of the views. As is apparent from FIG. 2, each rail assembly carries four satellites 100 in the arrangement shown in FIG. 1. Although this example satellite deployment system has the rail assemblies arranged parallel with the longitudinal axis of the dispenser 200, alternative rail assemblies may also be arranged perpendicular to that axis (e.g., rotated 90 degrees from what is shown) among other orientations, depending on the size and shape of the rail assemblies and fairing 201.

During mission launch phase, fairing 201 protects satellites 100 against aerodynamic, thermal and acoustic environments that the launch vehicle experiences during atmospheric flight. After the launch vehicle has left the atmosphere, fairing 201 is jettisoned and the satellites 100 may detach in patterns from payload dispenser 200, via timed control or other payload controller logic local to the dispenser 200 and/or telecommands from ground-based signaling received by said logic. The detachment of the various satellites 100 may be in any desired patterns from the payload dispenser 200, such as by each ring or row defined by the dispenser. The process of detaching/releasing the satellites 100 repeats until all of the satellites have been released from payload dispenser 200. Once released, each satellite 100 may use its own propulsion unit to position itself into its assigned, target orbit.

Figure 4:
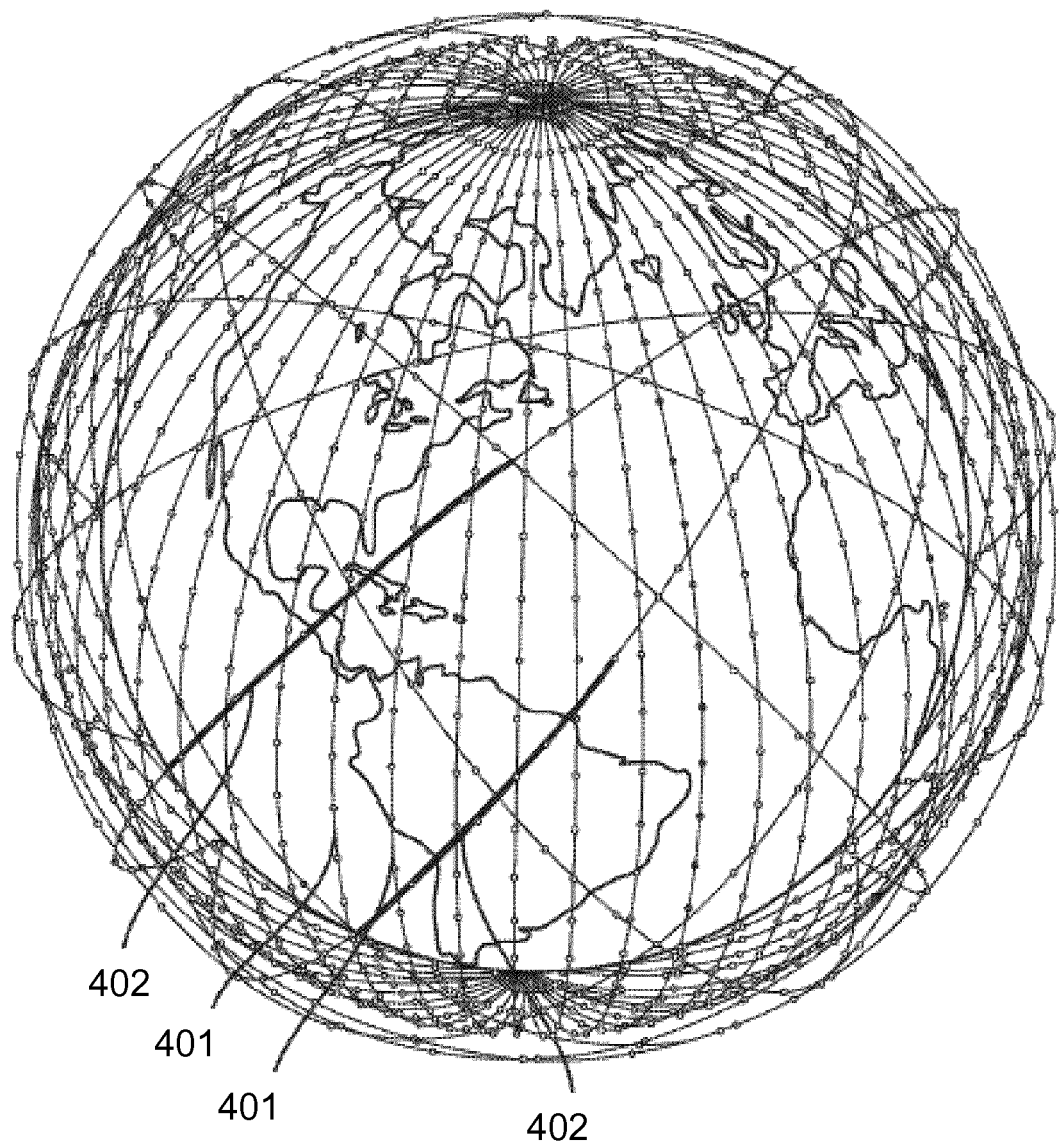
FIG. 4 shows example satellite constellations.

Satellites 100 may be released into an "insertion orbit", then maneuver towards a target orbital plane and a target orbital position along said plane (e.g., a target orbit) for establishing a sub-constellation of a satellite constellation. For example, FIG. 4 shows a first satellite constellation made up of satellites orbiting earth in a number of polar orbits depicted as lines 401. A second satellite constellation shown in FIG. 4 includes satellites orbiting earth in various non-polar orbits depicted as lines 402. It will be appreciated that only a few of the orbital lines 401 and 402 are labelled in the figure due to the large number of orbits depicted. These constellations of satellites may define a low earth orbit (LEO), medium earth orbit (MEO), or a combination thereof. The satellites of the first constellation arranged along a respective line 401 of longitude over the earth form a sub-constellation of the first constellation on a particular polar orbit plane. Similarly, the satellites of the second constellation arranged along a respective line 402 form a sub-constellation of the second constellation. Although LEO and MEO are shown, embodiments of the invention may include GEO, among other possible orbits.

As described above, payload dispenser 200 releases a subset of satellites generally close to the orbit intended for that subset for either direct or standard orbit insertion. After this release, the satellite must initiate control of various satellite components. For example, the satellite must initiate control of actuators, thrusters, and magnetorquers for performing initiation procedures such as reaching a target orbit (e.g., an orbital plane), reaching a particular orientation vis-à-vis the Earth and/or sun (i.e., attitude control), deploying and orienting solar arrays, and deploying and orienting communication antennas.

The initiation procedures may include a control algorithm that operates during the launch and early orbit phase of the satellite mission. Satellites typically operate in different control paradigms when implementing the launch phase (e.g., OFF or Stand-By state before transfer phase), transfer phase, mission phase (e.g., a satellite operating in the target configuration of a target orbit), and deorbit phase, among possible other phases.

Referring again to FIG. 4, the respective planes of sub-constellations along lines 401 are offset from each other by a respective angle about the polar axis. A given two sub-constellations along lines 401 may be nearly orthogonal to one another for example. The ideal or target initial configuration of satellites residing in, for example, orthogonal orbital planes differs considerably (e.g., "windmill" vs. "BBQ" orientations). Such configurations may include a target orbital plane, a target orbital position along an orbital plane (e.g., a position within a sub-constellation), other target orbit parameters, target attitude, target solar array orientation, and target antenna orientation.

Launch-specific parameters such as the launch date largely dictate the scope of possible target orbits (e.g., a target orbital plane and position within one or more sub-constellations) as well as influence the above-mentioned target parameters. However, satellites may be built months or years before launch. Further, satellites may be mounted on sub-structures of a launch vehicle as shown in FIGS. 2 and 3 before final assembly of the launch vehicle at the launch site. Thus, launch-specific parameters such as launch date and time may not be known for a given satellite until long after the satellite is placed in its powered-down launch condition and mounted on the dispenser (such as 200 in FIGS. 2 and 3). This lack of launch-specific parameters may prevent a satellite from performing the desired autonomous operations necessary to place the satellite in the target orbit and achieve operational configurations.

Limitations on the satellite control systems may also affect a satellite's ability to perform autonomous operations during the transition from (launch-vehicle) detachment to mission state. For example, for weight and other concerns, satellite power systems typically use low-capacity batteries vis-à-vis the total energy needs of the satellite systems. This limitation on battery power leads to the requirement that the satellite systems, including the attitude and/or orbit control system, must operate efficiently after separation from the launch vehicle (and before solar array deployment and orientation). Another limiting factor is the condition of a satellite after separation from the launch vehicle. For example, a satellite may be spinning after the detachment from the launch vehicle. This spin rate may be too fast to utilize sensors such as a star tracker to effectively assist in autonomous attitude determinations and adjustments; star trackers, for one, typically cannot provide meaningful data if a satellite's angular rate is faster than 1° per second.

The present invention overcomes the above problems and limitations by providing launch-specific parameters (and perhaps other data) to an onboard, independently powerable and writable memory while the remainder of the satellite (particularly control systems thereof) is in an unpowered or non-operational (e.g., stand-by) state. Launch-specific parameters, such as launch dates and/or time and target orbital parameters, may be provided for guiding autonomous control modes and boot-up procedures during the transfer phase via a satellite control system (e.g., the attitude and/or orbit control system or components thereof) and associated functionalities. Launch-specific parameters may characterize launch time, a priori, at different resolutions. For example, the initial satellite attitude position may be controlled using a "launch-month" parameter, whereas other aspects should be controlled with an hour or even minute resolution (e.g., a "launch hour" or "launch minute" parameter).

Another possible aspect of the launch-specific parameter is a relative launch position on a payload dispenser such as dispenser 200 in FIGS. 2 and 3, a satellite separation time, and/or relative separation order from the payload dispenser. As just one example, an independently powerable and writable memory system according to aspects of the invention may be programmed with a specific launch time, wherein the launch position, separation time, and/or relative separation order from the payload dispenser is a further value that offsets the specific launch time. The offset launch/separation time may then be used for various autonomous control procedures required during the transfer phase based on, for example, time-triggered procedures defined at set temporal points after the satellite separates from the payload dispenser. Embodiments also include providing a payload separation time (with no offset) to each individual satellite or subsets of satellites that, for example, contemporaneously separate, albeit at different relative positions on the payload dispenser.

Figure 5:
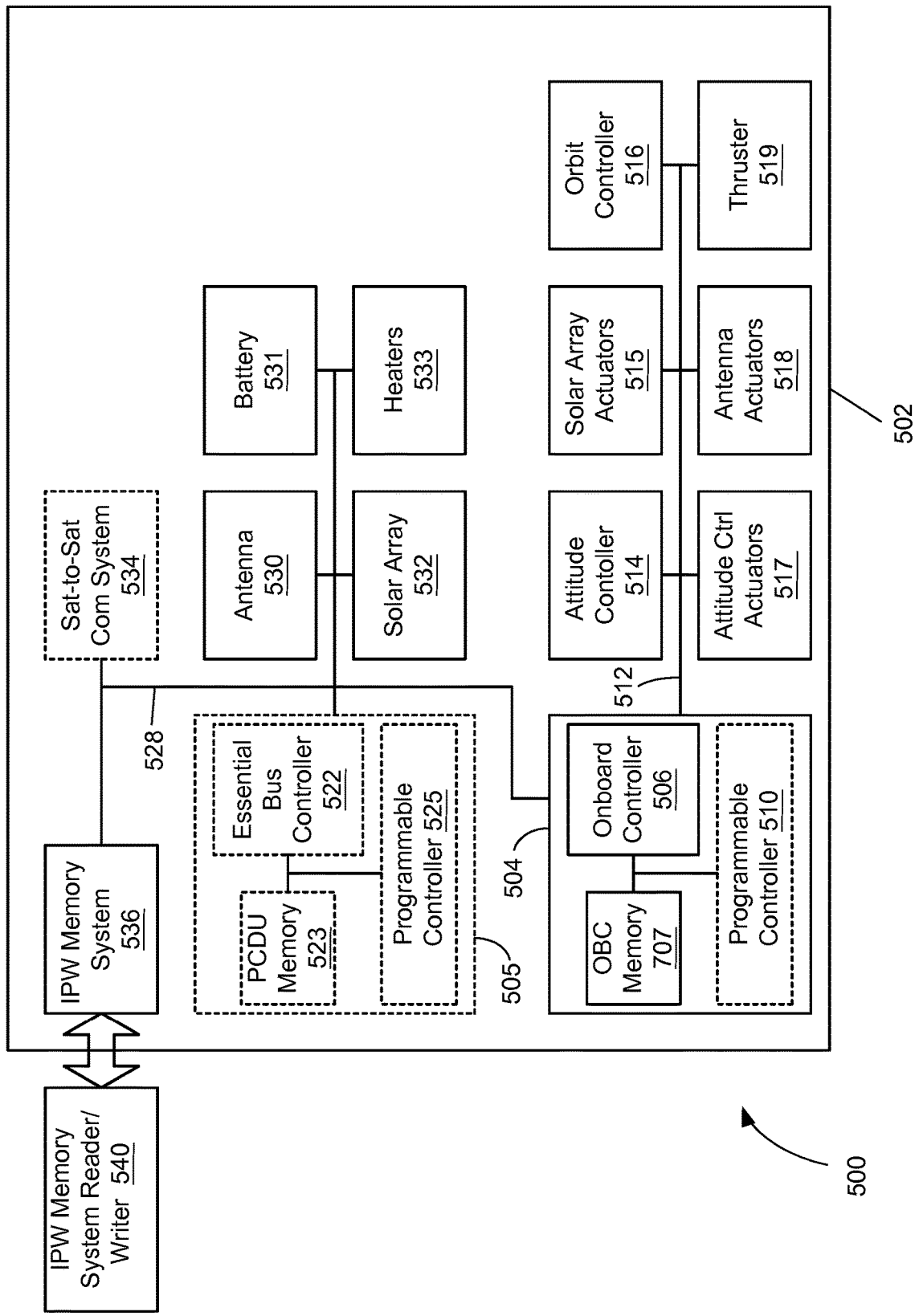
FIG. 5 is a schematic representation of a satellite with an IPW memory system according to example embodiments of the present invention.

FIG. 5 schematically shows an example satellite system 500 including a satellite shown as box 502. Satellite 502 has an onboard control system which includes a number of control devices for controlling operation of the satellite including autonomous control immediately after launch vehicle separation. These devices may include onboard control unit 504 and power control and distribution unit 505 which are typically mounted within a housing of satellite 502. Onboard control unit 504 in this illustrated example includes an onboard controller 506 together with onboard controller memory 507 which may store operational programming and data for the onboard controller. The illustrated onboard control unit also includes a programmable controller 510 which will be described in further detail below.

In this example satellite configuration, onboard control unit 504 is operatively connected to a data bus 512 which provides a bidirectional communication path to a number of components of the satellite. These components include an attitude controller 514, solar array actuators 515, orbit controller 516, attitude control actuators 517, antenna actuators 518, and thruster 519. Attitude controller 514 comprises a controller which provides output signals to various attitude control actuators 517 to place and maintain the satellite at a desired attitude. Attitude control actuators may include a system of magnetorquers and reaction wheels for example. Solar array actuators 515 comprise actuators for deploying and positioning the solar arrays included on the satellite, while antenna actuators 518 comprise an actuator arrangement for positioning one or more antennas of the satellite 502. Orbit controller 516 comprises a controller adapted to produce suitable outputs to orbit control devices such as thruster 519 to affect the orbit of the satellite both immediately after launch vehicle release and throughout the mission of satellite 502.

Power control and distribution unit 505 may include an essential bus controller 522 together with power control distribution unit (PCDU) memory 523, which provides operational program and data storage for the essential bus controller. The example satellite 502 shown in FIG. 5 may further include a programmable controller 525 included with the power control and distribution unit 505. This programmable controller 525 will be described further below.

Power control and distribution unit 505 is shown in FIG. 5 as being connected to a data bus 528 which facilitates bidirectional communications with controllers or other electronic components associated with antenna 530, battery 531 solar array 532, and heaters 533. A satellite-to-satellite communication system 534 may also be connected to bus 528 as illustrated in the example satellite 502. This satellite-to-satellite communication system 534 includes suitable emitters and receivers or antennas and associated electronics for facilitating communications to and from other satellites in the course of the satellite mission.

In the simplified schematic representation of FIG. 5, the power connections to the various components are not shown in order to simplify the drawing. It will be appreciated that many of the satellite components require a suitable power supply connection.

It should also be noted that the communications buses 512 and 528 are shown only to indicate that the various components of satellite 502 are connected in some fashion for communications. Buses 512 and 528 are not intended to imply any particular bus configuration or architecture. A satellite according to an embodiment of the present invention may include any suitable bus architecture and arrangement of control components and other components. FIG. 5 is provided simply as an example arrangement which may be employed in connection with an independently powerable and writable memory system according to aspects of the present invention. For example, the onboard controller 506 may perform the functionalities of controllers 514, 516, and 522, and thus satellite 500 may be operated by a single controller: onboard controller 506.

Satellite 502 includes an independently powerable and writable (IPW) memory system 536 which in this example is also connected to communications bus 528. The position of IPW memory system 536 within the box representing satellite 502 is intended to indicate that this memory system may be located within a housing defined by the satellite or at least partially within such a housing. However, as will be discussed in detail below, an IPW memory system according to aspects of the present invention or components of such a memory system may be mounted external to the housing defined by the satellite. Further details regarding the mounting location for an IPW memory system according to the present invention will be described below in connection with FIGS. 14A through 17A and 14B through 17B. Also as will be discussed further below, other implementations of the invention may include a wireless connection between satellite components and an IPW memory system, and thus the IPW memory system may not be connected on any data bus or other wired communication path of satellite 502.

FIG. 5 also shows a reader/writer 540 which is configured to communicate with, for example, IPW memory system 536 to at least write data such as launch-specific parameter data to the IPW memory system. Reader/writer 540 is external to the satellite system in the sense that it or parts thereof are not a part of the satellite to be launched into orbit. Although the example of FIG. 5 indicates that the device 540 is a reader and writer, some implementations may not facilitate a reading function, but only the capability of writing data to the IPW memory system (or systems if multiple IPW systems are included in a given implementation).

Various alternatives for facilitating the communications between a reader/writer such as device 540 and IPW memory system 536 will be described further below in connection with FIG. 6. In any case however, system reader/writer 540 is adapted to write data, such as launch-specific parameter data for example, to the IPW memory system 536 while the remainder of the satellite components are unpowered (e.g., OFF) or otherwise in an idle state prior to launch. In order to facilitate this functionality, reader/writer 540 may be a portable device that may be brought into an operating position relative to the IPW memory system 536 by a worker or otherwise (e.g., an autonomous machine). Once in such an operating position, reader/writer 540 may be operated to at least write the desired data to IPW memory system 536 without changing the state of the other satellite system components, that is, while those other components remain OFF or idle. The proper operating position for a given reader/writer 540 will depend upon the nature of the data transmission employed by the reader/writer and will be discussed further below in connection with the different data transmission techniques which may be employed.

Once satellite 502 is launched and is powered up either before or after separation from the launch vehicle, one or more of the controllers included in the satellite, such as onboard controller 506 an/or essential bus controller 522 is configured to read the data stored in the IPW memory system 536. This reading operation may be accomplished via any suitable communications link between the controller and IPW memory system. For example, onboard controller 506 may be adapted to communicate with IPW memory system 536 over a data bus such as bus 528 in FIG. 5. Alternatively, and as will be discussed below particularly in connection with FIG. 9, controller 506 may be associated with components that facilitate reading data from the IPW memory system 536 wirelessly. In any event, where the data comprises particularly launch-specific parameter data, the controller then may use the data directly or indirectly as will be described further below to facilitate autonomous control of the satellite particularly in the transfer phase immediately after launch vehicle separation and before communications are possible with ground control facilities. This autonomous control may include a number of transfer phase functionalities (functions performed during the transfer phase) and generally comprising a list of procedures for initial satellite startup/orbit establishment, which may use the time/launch parameters as a reference time, and perform the procedure at a time (t+N seconds) later than said reference time.

The schematic representation of FIG. 6 provides further details of an example embodiment of both the IPW memory system 536 and reader/writer 540 shown in FIG. 5. The example IPW memory system 536 shown in FIG. 6 includes an IPW memory controller 601 and IPW memory 602. An input/output interface 604 is provided and connected in this example to three different data communication routes, an optical route, a wireless RF route, and a wired route. The optical route is associated with optical devices 606 while the wireless RF data route is associated with antenna 607, and the wired route is associated with wired connector 608. Each of these elements, optical devices 606 for optical communications, antenna 607 for wireless RF communications, and connector 608 for wired communications represents a respective data exchange interface for at least receiving data communicated from reader/writer 540. This example IPW memory system 536 is also adapted to communicate with other satellite-mounted components through satellite system data interface 614 which may for example be connected to a suitable data bus such as bus 528 shown in FIG. 5. The illustrated example IPW memory system 536 further includes an onboard power supply 610 and a satellite system power input 611 for providing power to the IPW memory system components in operation as described further below.

The reader/writer 540 shown in FIG. 6 includes a read/write controller 620 and an input/output interface 621 associated with three different data routes corresponding to the data routes of the example IPW memory system 536 shown in FIG. 6. These routes include an optical route for optical communications through optical devices 624, a wireless RF communications route through antenna 625, and a wired communications route through wired connector 626.

The example IPW memory system 536 and reader/writer 540 include the three different data communication routes between the two devices primarily for convenience in describing the various types of data communications that may be employed according to the present invention. It should be appreciated that an implementation of the invention may include only a single data communication route comprising an optical route, a wireless RF route, or a wired route and may not include all three different communication routes. However, some implementations, particularly of the reader/writer, may include different communication routes to accommodate different implementations of IPW memory systems that may be installed on various satellites. By the same token, an IPW memory system may include a single communication route (optical, wireless RF, or wired) or multiple alternative communication routes to accommodate reader/writers that may support only a single communication route. In any event, in the example of FIG. 6 communications between optical devices 624 and optical devices 606 indicated by arrow 630 may be through suitable optical signals. The optical devices themselves may include suitable electro-optical converters and opto-electrical converters to provide transmission and receiving functions. Communications between antennas 625 and 607 as indicated by arrow 631 may be in the form of suitable RF signals. Communications across the wired route between wired connector 626 and wired connector 608 indicated by arrow 632 may be through a suitable electrical cable according to any suitable communications standard. Alternatively, wired connector 626 may be at the end of a suitable electrical cable and adapted to connect to wired connector 608 of IPW memory system 536.

Because IPW memory system 536 is adapted to operate to receive the desired launch specific parameters while the satellite system is powered down, the device may include onboard power 610 which may comprise a suitable battery. The satellite system power input 611 in the example of FIG. 6 is provided to facilitate operating power for IPW memory system 536 from the satellite power distribution system once the satellite or portions thereof are powered on. As will be described below further particularly in connection with FIG. 7, an IPW memory system according to the invention may not require onboard power or a satellite system power input for operation and thus these elements may be omitted in a given implementation. Similarly, the desired satellite system controller or controllers which obtain launch specific parameters from IPW memory system within the scope of the present invention may not require a separate satellite system interface such as 614 shown in FIG. 6. These alternatives will be described below particularly in connection with FIG. 9.

FIG. 7 shows a schematic representation of an alternate IPW memory system 700 that may be used alternatively to the system 536 shown in the example of FIGS. 5 and 6. IPW memory system 700 includes IPW memory controller 701 an input/output interface 702, and antenna 704, and satellite system data interface 705, but does not include any onboard power system or input for external power. Rather than requiring onboard power, IPW memory system 700 is instead powered through signals received through antenna 704. This may be accomplished in the same way a passive RFID device may be operated. Thus the IPW memory system 700 is adapted to cooperate with a reader/writer including a corresponding RF antenna such as antenna 625 described above in connection with FIG. 6. In operation, the antenna of the reader/writer is brought into communication range of IPW memory system 700 to provide the desired power and data transfer through antenna 704 to write the desired data into IPW memory 701. This data may then be read later at an appropriate time by a satellite controller such as onboard controller 506, either through satellite system data interface 705 or wirelessly as will be discussed below in connection with FIG. 9.

As an alternative to the RF wireless arrangement shown for example in FIG. 7, an IPW memory system according to the present invention may rely on external power that is not supplied wirelessly. For example, an IPW memory system may be adapted to receive both power and data through a wired connection such as that made through connectors 608 and 626 in FIG. 6. In this case, power required by the IPW memory system to write the desired data without satellite system power may be supplied from the writing device (such as 540 in FIGS. 5 and 6), and the power required for a read operation from the satellite system may be provided through a satellite system power input to the IPW memory system upon satellite control system boot up.

FIG. 8 provides a schematic representation of a reader/writer 800 which is adapted to be used with an IPW memory system having an antenna such as antennas 607 or 704 for receiving data. This particular embodiment shown in FIG. 8 includes a portion which is external to the satellite and an antenna 802 which is mounted within the satellite. The line 804 in FIG. 8 depicts a boundary such as a wall or barrier defining a portion of the satellite enclosure. The external portion of device 800 shown in FIG. 8 includes a read/write controller 808 and an input/output interface 809. Input/output interface 809 is connected by a suitable communication path to a connector 812 which is separable from a satellite-mounted connector 814 operatively connected to antenna 802. In operation of the reader/writer 800 shown in FIG. 8, an operator may connect connector 812 to the complementary connector 814 mounted in a suitable accessible location on satellite wall 804. With this connection made, reader/writer 800 may then send an appropriate driving signal to drive antenna 802 to emit suitable RF signals which may be received by a complementary antenna of an IPW memory system which may be mounted within the satellite enclosure behind wall 804. The arrangement shown in FIG. 8 with the reader/writer antenna 802 located within the satellite enclosure avoids any issues with interference of RF communications across the satellite enclosure walls. Also the arrangement shown in FIG. 8 allows antenna 802 to be positioned advantageously with respect to the antenna of the IPW memory system within the satellite. This may be desirable to ensure that the two antenna are within the proximity required for communications or communications and power transfer. As an alternative to the RF communication arrangement implied by the antenna 802 shown in FIG. 8, a reader/writer may employ optical communications to an IPW memory system which may be mounted within the satellite enclosure behind a wall such as wall 804. In this alternative the satellite wall may include a suitable optical port to allow optical transmissions from outside to inside the satellite enclosure. Alternatively to an optical port, a satellite wall such as wall 804 may include an opening which may be exposed to allow a probe mounted optical transmitter/receiver to be inserted into the interior of the satellite enclosure. Such a probe opening may also be used to insert a probe-mounted antenna in an RF communication arrangement. In the case of optical communications, the opening for receiving the probe may be configured so that the probe is held in a particular orientation to direct the optical signals to the corresponding optical devices of the satellite mounted IPW memory system.

Figure 9:
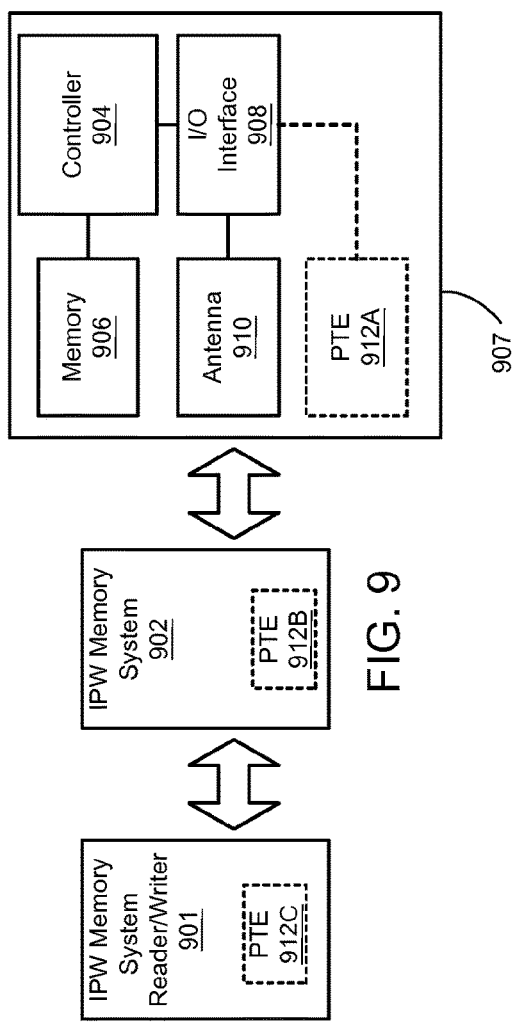
FIG. 9 is a schematic representation of an arrangement which may employ wireless communications between a satellite system controller and IPW memory system.
Figure 11:
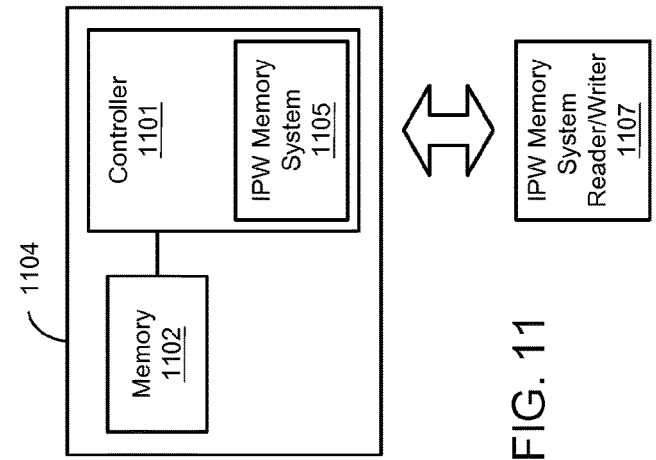
FIG. 11 is a schematic representation of an arrangement in which an IPW memory system is included in a common integrated circuit package with a satellite system controller.
Figure 10:
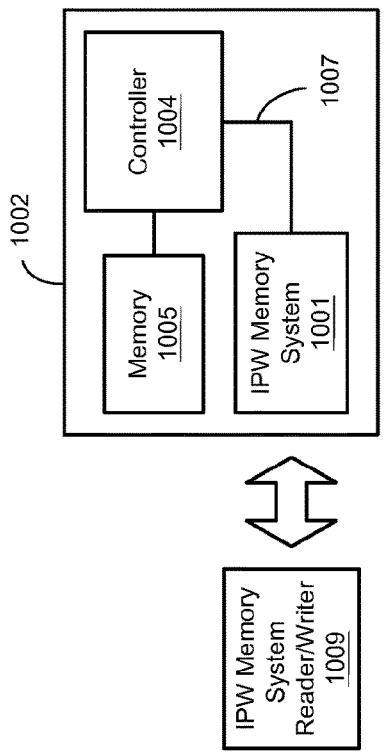
FIG. 10 is a schematic representation of an arrangement in which an IPW memory system is included on a common substrate with a satellite system controller.

FIGS. 9-11 show schematic representations of various configurations which may be employed to facilitate writing launch specific parameters and other data to an IPW memory system and then reading the stored data by a satellite controller upon a boot up process for the controller/satellite. FIG. 9 shows a reader/writer 901 which may correspond to the device 540 shown in FIGS. 5 and 6, and also shows an IPW memory system 902 which may correspond to IPW memory system 536 in those figures. These two systems may be configured to communicate through any of the routes described in FIG. 6, for example. IPW memory system 902 may be mounted outside of the satellite enclosure or inside the satellite enclosure. The example of FIG. 9 also shows a satellite controller 904 which may correspond to a controller such as controller 506 or 522 in FIG. 5, and a memory device 906 which may correspond to memory 507 or 523 in FIG. 5. Controller 904 and memory 906 in FIG. 9 are mounted on a suitable substrate 907 which may comprise a printed circuit board (PCB) for example. Also mounted on the PCB 907 in FIG. 9 are an input/output interface 908 and an antenna 910. The input/output interface 908 and antenna 910 arrangement mounted on PCB 907 allows controller 904 to communicate with IPW memory system 902 wirelessly through an antenna associated with the IPW memory system. The wireless communication between controller 904 and IPW memory system 902 may be according to any wireless communication standard including the same standard and technique which may be used to communicate between the reader/writer 901 and IPW memory system 902. In particular, IPW memory system 902 may include an antenna that both facilitates reading and writing from reader/writer 901 and also reading from controller 904 through input/out interface 908 and antenna 910.

Further still, controller 904 may include an antenna (e.g., antenna 910 or other coupling devices such as power transfer element (PTE) 912A) that wirelessly transfers power from controller 904 to IPW memory system 902. Wireless power transfer techniques may include near-field techniques (e.g., inductive-coupling) or far-field techniques. In one embodiment, PTE 912A is a coil arranged within an operative distance from PTE 912B (e.g., a coil arranged on or in IPW memory system 902) for power transfer. PTE 912A, as a coil or in another form, may be arranged on or embedded in PCB 907 or another substrate of controller 904 for a particularly robust design that is able to withstand substantial vibration. PTE 912C of reader/writer 901 may also be arranged within an operative distance of PTE 912B for power transfer.

FIG. 10 shows an arrangement in which an IPW memory system 1001 which may correspond to IPW memory system 536 in FIGS. 5 and 6 is co-located on a substrate such as PCB 1002 together with a satellite system controller 1004 and its associated memory 1005. In this case IPW memory system 1001 may communicate across a wired connection 1007 to satellite system controller 1004. However it will be appreciated that even when an IPW memory system is co-located on a substrate with the satellite controller adapted to read data from the IPW memory system, the read operation may be performed via any communication technique, including electrical signal transmissions over a wired connection, wireless RF transmissions, or optical transmissions. In any event the IPW memory system 1001 is adapted to communicate with reader/writer 1009 across a suitable communication route which may include any or all of the routes or a subset of the routes shown in FIG. 6.

FIG. 11 shows an arrangement including a satellite system controller 1101 (which may correspond to controller 506 in FIG. 5 for example) and its associated memory 1102 mounted on a suitable substrate 1104. In this case the IPW memory system 1105 (corresponding to system 536 in FIGS. 5 and 6) is contained in the same integrated circuit package as controller 1101. Reader/writer 1107 (corresponding to 540 in FIGS. 5 and 6) may communicate with the IPW memory system 1105 across any or all the routes discussed above in connection with FIG. 6. Controller 1101 may preferably communicate with IPW memory system 1105 via a wired connection however, it is possible that the communications between controller 1101 and IPW memory system 1105 may be wireless either via RF or optical signals.

Figure 13:
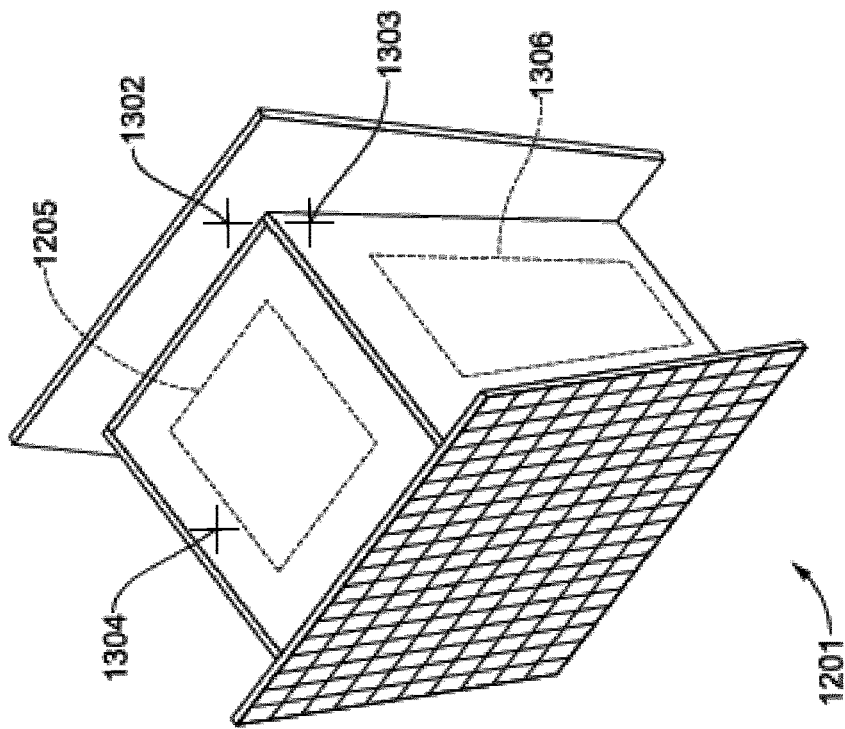
FIG. 13 is a representation of the satellite of FIG. 12 from a different perspective showing additional mounting locations for an IPW memory system according to aspects of the present invention or data transfer locations for an IPW memory system.
Figure 12:
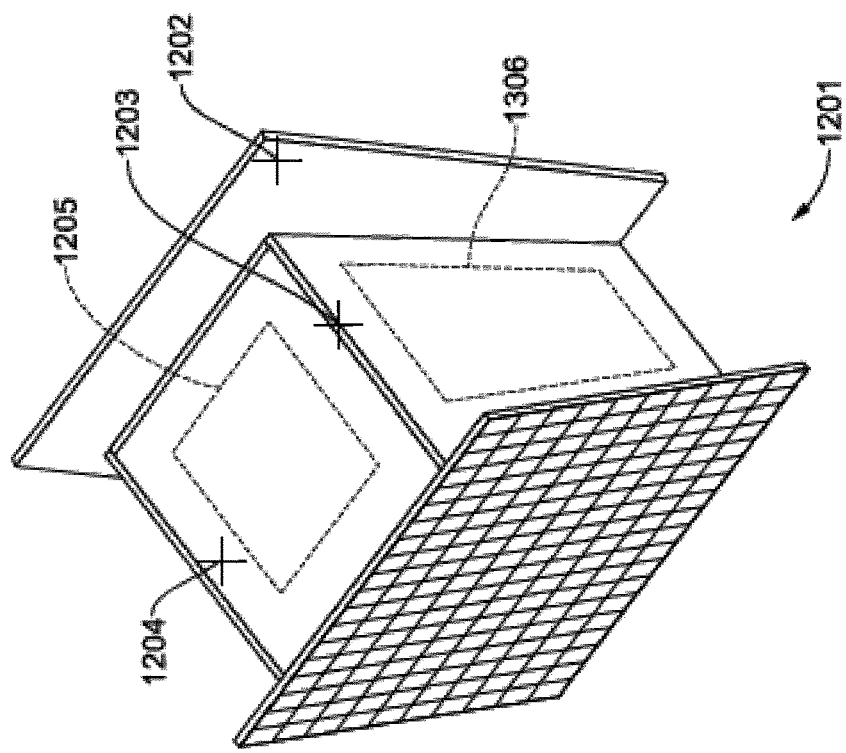
FIG. 12 is a representation of a satellite showing various mounting locations for an IPW memory system according to aspects of the present invention or data transfer locations for an IPW memory system.
Figure 15A:
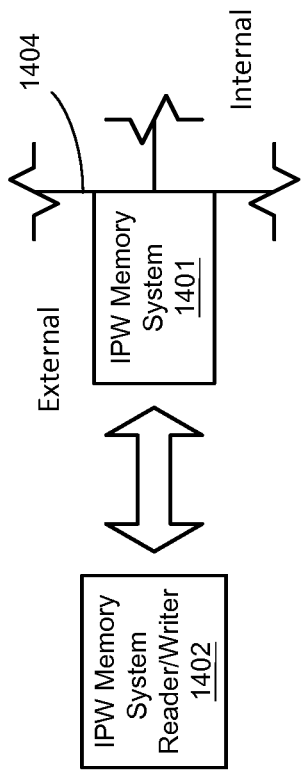
FIGS. 15A and 15B are schematic representations showing a second alternative mounting location for an IPW memory system.

FIGS. 12 and 13 show an example satellite 1201 in which an IPW memory system may be included according to the present invention. FIGS. 12 and 13 also show various locations at which IPW memory system components, and particularly a data exchange interface such as any of such interfaces described above in connection with FIG. 6, may be located on (or relative to) the satellite exterior. Referring to the view of FIG. 12, an IPW memory system or system components such as an antenna or optical transmission and receiving devices or a connector for making a wired connection may be mounted on a backside of a solar array at location 1202. An IPW memory system or components thereof may also be mounted at location 1203 and/or location 1204. In FIG. 13 an IPW memory system or components thereof may be mounted at any of locations 1302, 1303, or 1304, for example. Dashed box 1205 in FIGS. 12 and 13 represents an area on an outer surface of the satellite enclosure (the surface typically facing outwardly when the satellite is mounted on a payload dispenser such as 200 in FIGS. 2 and 3) in which various external satellite components may be mounted. For example, an antenna or antenna array may be mounted in the area shown as dashed box 1205. Dashed box 1206 in FIG. 12 and dashed box 1306 in FIG. 13 each represents and area on a side of the satellite enclosure on which additional external satellite components may be mounted. The example locations 1202, 1203, 1204, 1302, 1303, and 1304 are all in areas outside of dashed boxes 1205, 1206, and 1306 indicating that the locations are outside of areas where external satellite components may be mounted. However, embodiments of the present invention may incorporate an IPW memory system or components thereof with an external satellite component. In particular, the data exchange interface for an IPW memory system according to the present invention may be mounted on some other satellite component, such as an antenna separate from any IPW memory system antenna.

Because the IPW memory system or components at any of these locations 1202, 1203, 1204, 1303, 1302, or 1304 may be inconspicuous, the locations may be highlighted graphically to allow a reader/writer operator to identify the locations and bring the required reader/writer (corresponding to 540 in FIGS. 5 and 6) in proper proximity to the location to facilitate data transfer to the IPW memory system. Furthermore, the IPW memory system component or IPW memory system itself may be behind a wall or embedded in a wall or other satellite component in some locations such as locations 1303 in FIG. 13, and thus the location must be highlighted or include some visible identifier to allow the reader/writer operator to position the reader/writer for performing the desired data transfer. It will be noted that all of the locations 1202 through 1204 and 1302 through 1304 shown in FIGS. 12 and 13, respectively, are locations that are readily accessible on the satellite when the satellite is mounted on a dispensing system such as payload dispenser 200 shown in FIGS. 2 and 3 when the fairing 201 is not installed on the launch vehicle.

FIGS. 14A through 17A show schematic representations indicating several alternatives for mounting an IPW memory system 1401 on a satellite (the IPW memory system 1401 correspond to IPW memory system 536 shown in FIGS. 5 and 6). FIGS. 14B through 17B also show schematic representations indicating several alternatives for mounting an IPW memory system 1401 on a satellite (the IPW memory system 1401 correspond to IPW memory system 536 shown in FIGS. 5 and 6), including the IPW memory system reader/writer 1402 connecting to a plurality of IPW memory systems 1401, but otherwise correspond to FIGS. 14A through 17A.

Figure 17A:
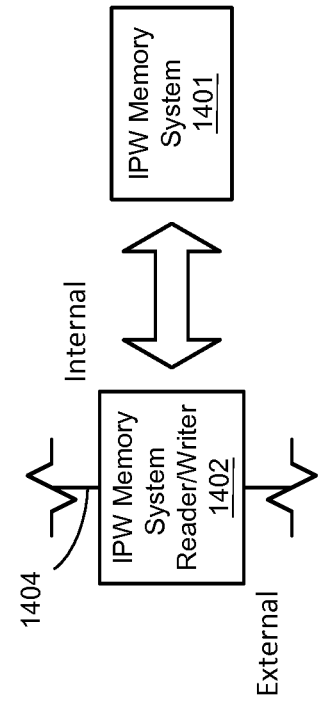
FIGS. 17A and 17B are schematic representations showing a potential position of an IPW memory system reader/writer for facilitating communications with an IPW memory system according to aspects of the present invention.
Figure 14A:
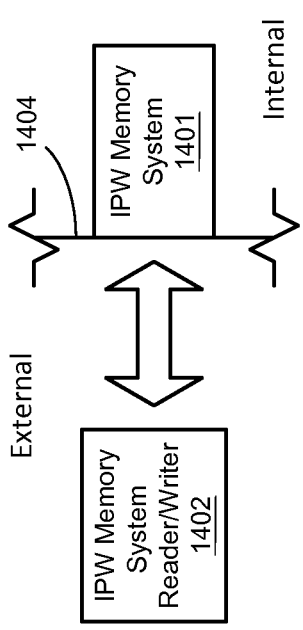
FIGS. 14A and 14B are schematic representations showing a first alternative mounting location for an IPW memory system within the scope of the present invention.
Figure 16A:
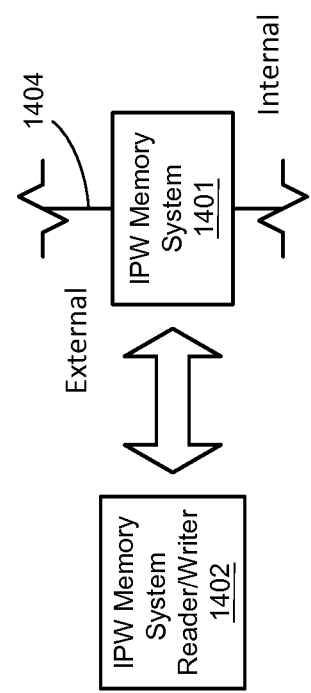
FIGS. 16A and 16B are schematic representations showing a third alternative mounting location for an IPW memory system.
Figure 15B:
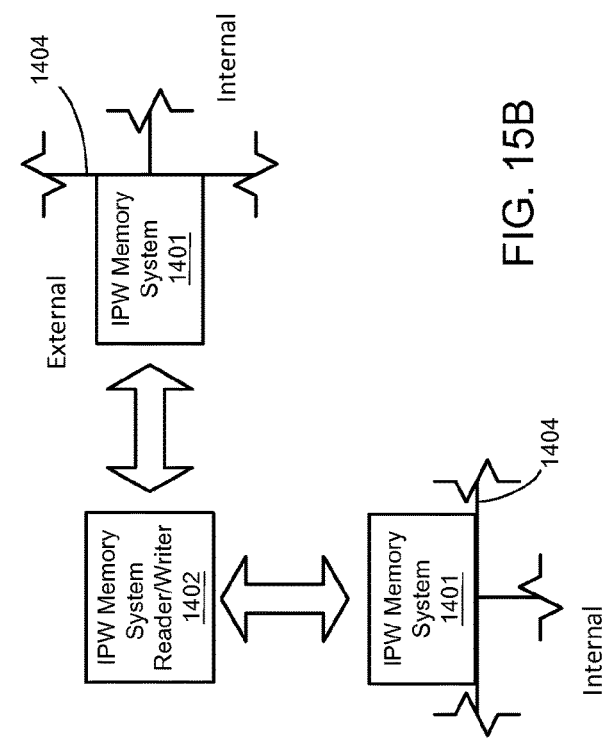
Figure 17B:
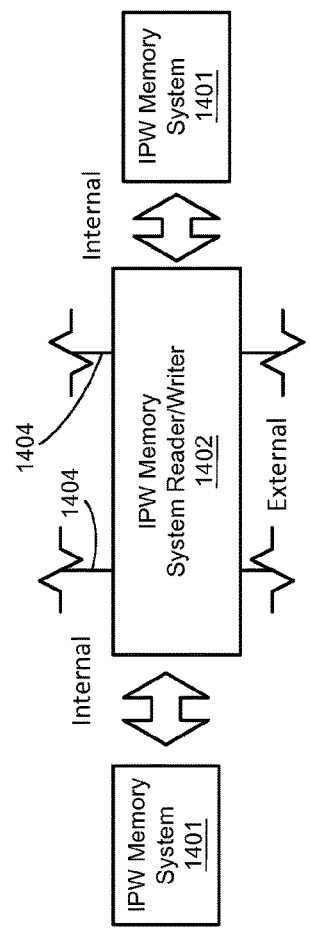
Figure 14B:
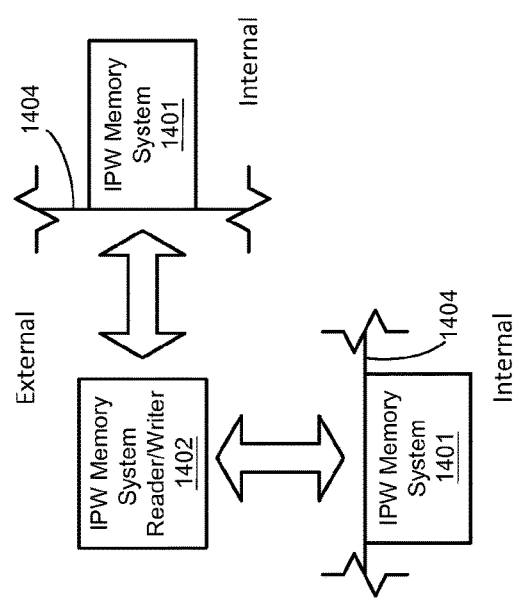
Figure 16B:
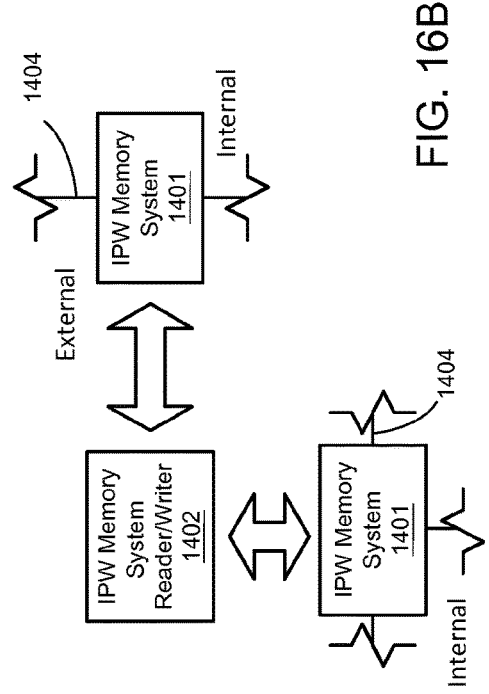

IPW memory system reader/writer 1402 in FIGS. 14A through 17A and 14B through 17B corresponds to the memory system reader/writer 540 shown in FIGS. 5 and 6. In each of FIGS. 14A through 17A and 14B through 17B, a wall defining a portion of the satellite enclosure is indicated at 1404. In the example of FIGS. 14A and 14B, IPW memory system 1401 or a portion thereof (such as an antenna) is mounted on the face of wall 1404 on the interior of the enclosure. In FIGS. 15A and 15B IPW memory system 1401 is mounted on wall 1404 on the exterior of the satellite enclosure. FIGS. 16A and 16B show an alternative in which IPW memory system 1401 is partially mounted on the interior of the enclosure defined by wall 1404 and partially on the exterior of the enclosure. For example, an antenna associated with the IPW memory system 1401 may be mounted on the exterior of the enclosure defined by wall 1404 whereas the remainder or other components of IPW memory system 1401 may be mounted on the interior. FIGS. 17A and 17B show an alternative in which IPW memory system 1401 is mounted at some location on the interior of the enclosure defined by wall 1404 while reader/writer 1402 traverses that wall. A probe associated with reader/writer 1402 may traverse satellite wall 1404 in the manner described above in connection with FIG. 8.

Numerous variations on the IPW memory systems shown in the drawings are possible within the scope of the present invention. For example, although a single IPW memory system is included in each example drawing, embodiments of the invention may have multiple or redundant IPW memory systems which may all be identical or may include different interfaces to a reader/writer such as reader/writer 540 in FIGS. 5 and 6, and/or different interfaces to one or more satellite controllers. Also, the type of memory used in an IPW memory system according to the invention may comprise any suitable type of memory, or multiple types of memory. The memory included with an IPW memory system may also emulate any standard memory via a controller or processor of the IPW memory system or via some other processor included on the satellite.

An IPW memory system or its various components may be coupled to a satellite component such as a harness (e.g., an interconnect cable), a structural wall, a structural rib, a structural bracket, or a circuit substrate (e.g., a PCB) of any satellite component (and not just a controller as described above in connection with FIGS. 10 and 11).

Additionally, an IPW memory system may be housed within an end connection piece of a satellite system cable. Where an IPW memory system provides for a wired connection to a reader/writer such as 540 in FIG. 5, the wired connection may have a commercial off the shelf standard connector arrangement or any other type of connector arrangement to make the desired wired connection. A wired connection between an IPW memory system and a satellite system component may also employ a commercial off the shelf standard connector arrangement or any other type of connector arrangement to make the desired wired connection to a satellite system controller or bus.

Wired and wireless communications between an IPW memory system and a reader/writer (such as 540 in FIG. 5) and a satellite system controller (such as 506 and 522 in FIG. 5) may be accomplished using any suitable standard or any non-standard technique. For example, communications may be through near field communications (NFC) standards, or ISO RFID or EPCGlobal standards for RFID systems. The communications may employ any type of electromagnetic coupling to transfer data.

In some embodiments, an IPW memory system may rely on components of a satellite-to-satellite communication system such as 534 in FIG. 5 (an inter-satellite communication system) for communications particularly with a reader/writer such as reader/writer 540 in FIG. 5. In these embodiments, the memory device reader/writer may communicate with an IPW memory system via an inter-satellite communication technique or an alternative communication technique, using receivers and transmitters or other components of an inter-satellite communication system in lieu of receivers and transmitters (such as devices 606 and 607 in FIG. 6) included in the IPW memory system.

Launch-specific parameter data which may be stored via an IPW memory system such as 536 in FIGS. 5 and 6 may include data defining various parameters that directly or indirectly control a physical orientation of the satellite (e.g., attitude control) or a component thereof such as antenna or solar array. Launch-specific parameters may include orbital parameters, various control parameters, and other launch-related values. For example, satellites may separate from the launch vehicle in different initial orientations, relative positions and times, depending on how and where the satellite is attached to the launch vehicle. This could be up to 24 possible different orientations, alone, in the case of cube-shaped satellites. "Launch orientation" is a possible launch-specific parameter which may inform a control algorithm when stabilizing likely (e.g., predicted) satellite spin caused by separating from the launch vehicle.

Orbital parameters may include orbital perturbations; a target orbit (orbital state vectors (e.g., one or more of a target position vector; semi-major axis; eccentricity; inclination; right ascension of ascending mode; argument of perigee)); anomaly; launch date and/or time(s); and/or station-keeping criteria.

Direct control parameters may include parameters that directly specify, for example, solar array actuators 515 and/or antenna actuators 518 orientations to achieve a specific placement of solar array 532 and/or antenna 530 vis-à-vis, for example, the Earth and/or Sun, suitable for the launch date.

Indirect control parameters may include a launch date, launch date offset value, or other time or date-related parameter which are used to select or determine, for example, direct control parameters. Time-based parameters are advantageous because satellites may be finished and possibly mounted on a platform (that couples with a launch vehicle dispenser) months or years before launch. This time delay may change the optimal (or even functional) target orbit, target attitude, target antenna positioning, and/or target solar array positioning.

As an indirect control parameter, a value representative of a launch date or time may be inputted to, for example, onboard controller 506 for retrieving direct-control parameters from a local memory, which organizes said direct-control parameters according to a specific launch date. For example, the direct control parameters stored in local memory may be set according to a default date (e.g., January 2018) that is updated by an explicit date or offset value from a parameter stored in the IPW memory system such as 536 in FIG. 5. As just one example, an offset value of "six" may cause onboard controller to select parameters based on a July 2018 launch time frame rather than a default January 2018 time frame. Such an offset value is directly relevant to satellite attitude, solar array placement, and antenna placement for low earth orbit communication satellites since the launch dates/time generally correspond to a respective polar orbit planes (and placement within the sub-constellation).

As another example, launch time may be used as a reference time, where AOCS and other control-system (propulsion, RF, and other payload control systems) perform a set of control operations or modes, relative to the reference time. An a priori launch parameter (as opposed to a contemporaneously observed launch parameter), thus, allows the satellite to "boot-up" and perform other transfer phase procedures before a time signal can be obtained via RF-based avionic systems (e.g., obtaining and processing GPS data).

As noted above in connection with FIG. 3, satellite 502 includes programmable controllers 510 and 525. These programmable controllers 510 and 525 and other such controllers which may be included on a satellite may be, for example, reprogrammable (SRAM based) field programmable gate arrays or perhaps one-time programmable field programmable gate arrays. One or more of these controllers may be used in satellite control operations and particularly autonomous control in transition from launch phase to on-station operational phase. Regardless of the use of such a programmable controller, an IPW memory system such as system 536 in FIGS. 5 and 6 may be used to store configuration data for configuring the programmable controller. Configuration data may include a hardware description language based code listing, which describes the structure and behavior of the programmable controller. Programmable controller 510 and/or 525 may control a particular satellite component and/or operate as an interface among the components, including serial interfaces for Rx/Tx processing modules, GPS, gyro, sun sensor, high-resolution image sensor(s), and reaction wheel components. Programmable controller 510 is illustrated in FIG. 5 as a discrete controller communicatively coupled to or a module of onboard control unit 504 and may be programmed to provide a data interface and processing functionalities for onboard control unit 504. Programmable controller 525 is illustrated in FIG. 5 as a discrete controller communicatively coupled to power control and distribution unit 505 and may be programmed to provide a data interface and processing functionalities for that satellite control unit. However, it will be appreciated that a programmable controller which may be configured using data read from an IPW memory system according to the present invention is not limited to any particular function for the satellite.

Figure 18:
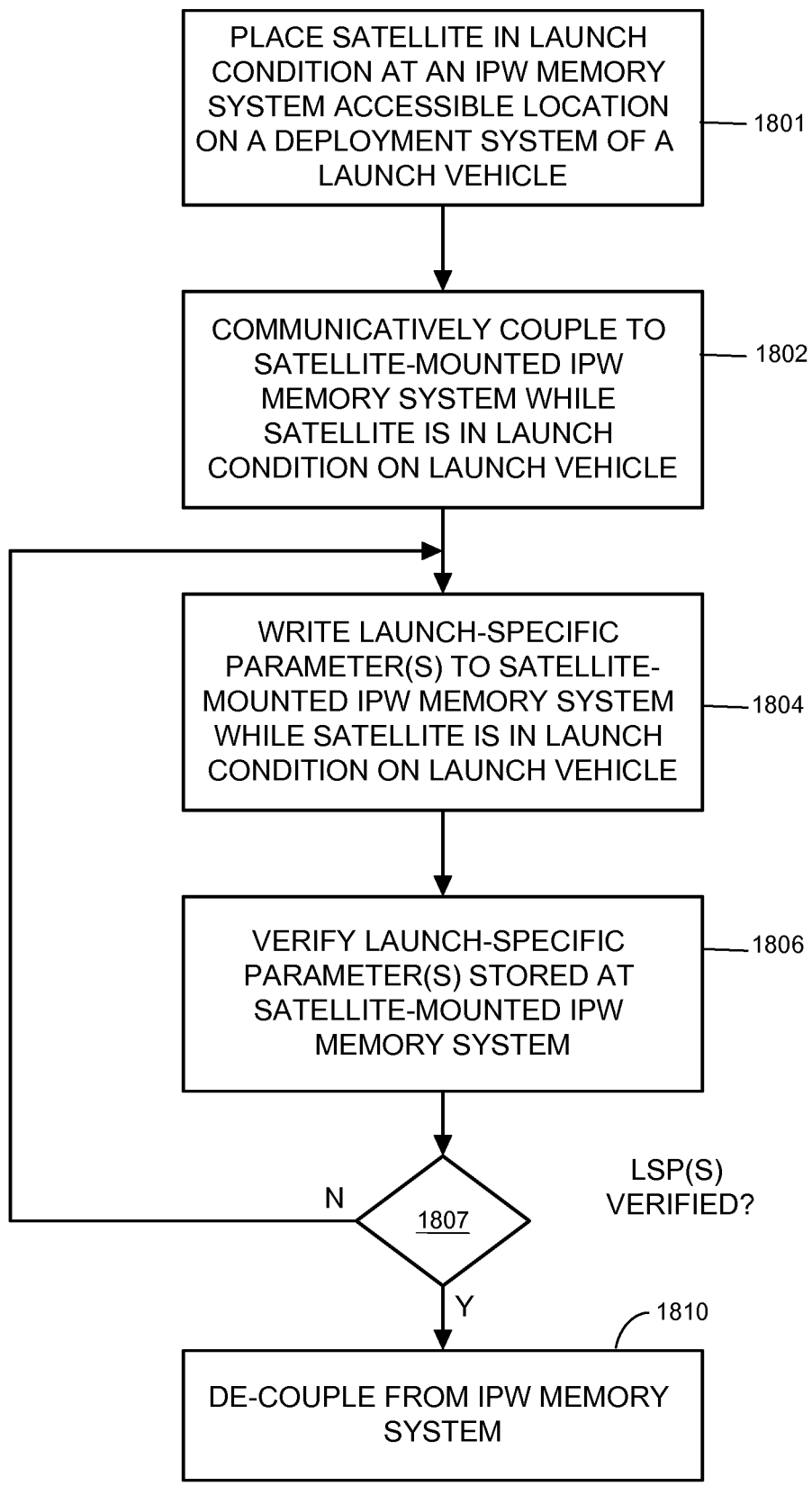
FIG. 18 is flow chart showing a method for transferring launch-specific parameters to an IPW memory system according to the present invention.

The flowchart of FIG. 18 may be used to describe methods for providing launch specific parameters (and other data such as configuration data for a field programmable gate array) to a satellite according to aspects of the present invention. The methods of providing data according to the invention are performed preferably when the satellite is in a powered down (e.g., OFF) or idle state such as the state of a satellite commonly required for launch. Thus FIG. 18 shows placing the satellite in a launch condition at an IPW memory system accessible location on a deployment system of a launch vehicle at process block 1801. The example method then includes communicatively coupling to the satellite-mounted IPW memory system (corresponding to 536 in FIGS. 5 and 6) while the satellite is in the launch condition on the launch vehicle as shown at process block 1802. This coupling performed at process block 1802 allows writing launch-specific parameters and/or other data (such as data which indirectly specifies one or more launch-specific parameters) to the satellite-mounted IPW memory system as shown at process block 1804. The illustrated method includes verifying the launch specific parameters stored at the satellite-mounted IPW memory system after writing as indicated at process block 1806. The purpose of this verification is to ensure that the write procedure indicated at 1804 was successful in placing the desired data in memory of the IPW memory system. The process at block 1806 may include reading the data from the IPW memory system and comparing the data thus read to the data which was intended to be written at process block 1804. If the comparison does not produce a match, the verification fails as indicated by a negative outcome at decision box 1807 and the process loops back to perform another write operation at block 1804. In the event the verification indicates that the desired data has been written to the satellite-mounted IPW memory system as indicated by an affirmative outcome at decision box 1807, the process includes decoupling from the IPW memory system as shown at process block 1810.

The nature of the coupling and decoupling indicated at process blocks 1802 and 1810 respectively in FIG. 18 will depend upon the type of communication to be used in the process for transferring data. For example, where a wired route is used coupling may include making a physical connection between a connector associated with the reader/writer (540 in FIG. 5 for example) to a connector on the satellite associated with the satellite-mounted IPW memory system. When the communication is via optical signals, the coupling may include placing an optical transmitter associated with the reader/writer within operable range and in line of sight with a corresponding optical receiver arrangement associated with the IPW memory system. Decoupling in this case may include simply taking the reader/writer transmitter out of line of sight/range. When the communication is through wireless RF transmissions, communicatively coupling to the satellite mounted IPW memory system as indicated at process block 1802 may include bringing an antenna associated with the reader/writer in range of an antenna associated with the IPW memory system mounted in or on the satellite. Decoupling in this case may include simply taking the IPW memory system reader/writer antenna outside of range of the corresponding IPW memory system antenna.

The method at block 1801 in FIG. 18 may include placing the satellite on a rail assembly such as that shown at 101 in FIG. 1, or any other satellite mounting assembly of a satellite deployment system. This placement of the satellite may be performed on the satellite deployment system either at the launch site or prior to the time the satellite deployment system is transported to the launch site. The IPW memory system accessible location for a given satellite may be any position in which the data exchange interface for the satellite, or at least one data exchange interface (such as optical devices 606, antenna 607, and connector 608 in FIG. 6) is in a location which allows a worker or perhaps a remotely operated device or robot to bring the memory system writer (such as reader/writer 540 in FIGS. 5 and 6) into an operative position with respect to the data exchange interface to facilitate the coupling and writing at blocks 1802 and 1804 in FIG. 18.

The launch condition for the satellite may be any condition in which the control system for the satellite is in a limited state as compared to the operational states of the satellite during a mission phase, particularly the onboard control system of the satellite. It will be appreciated that some devices on the satellite may remain powered in this launch condition. However, at least one processor/controller of the satellite control system remains in an OFF state in this launch condition.

Figure 19:
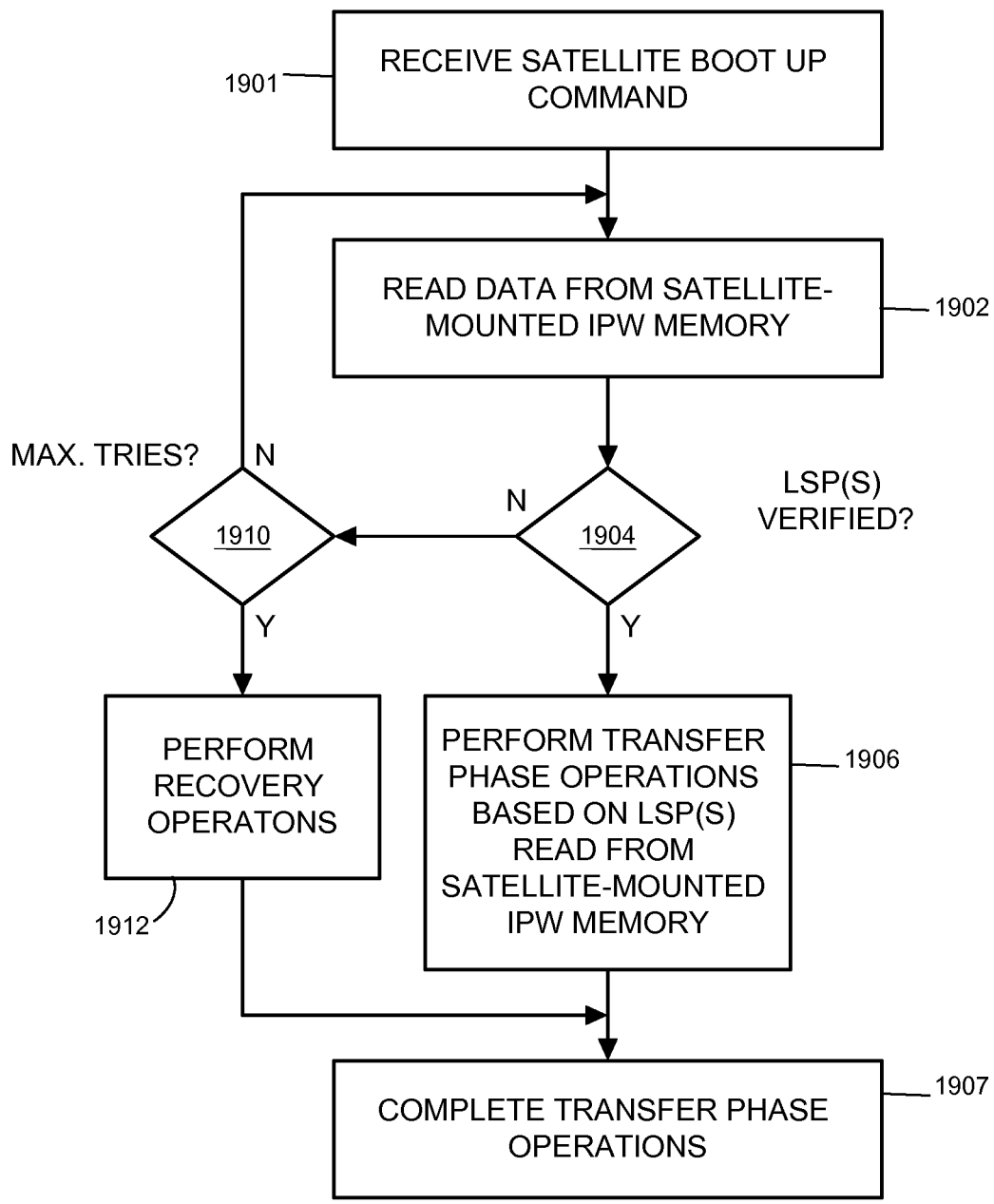
FIG. 19 is a flow chart showing a method according to an aspect of the invention for performing transfer phase operations at a satellite.

The flowchart of FIG. 19 shows a method of obtaining launch specific parameters for use in providing autonomous control in a satellite particularly during a transition from launch phase to an on station, operational phase. The method first includes receiving a satellite boot up command as shown at process block 1901. This command may be received at the given satellite upon detachment of the satellite from the launch vehicle or perhaps before detachment. For example, one or more electronic or mechanical switches mounted on the satellite may be configured to change state to produce or initiate production of the satellite boot up command when the satellite separates from the launch vehicle. Upon receipt of the satellite boot up command, the process includes reading launch specific parameters or parameter determinant data from the satellite-mounted IPW memory system (corresponding to 536 in FIGS. 5 and 6) as shown at process block 1902. In the case of the parameter-determinant data, the data may then be used, via a look up table or some other fashion, to obtain the actual launch specific parameters which affect satellite control. The illustrated method includes verifying the launch specific parameters as indicated at decision box 1904. This verification may include a comparison of the parameters read (or derived in the case of parameter determinant data) to expected parameters or an expected parameter range. If the launch specific parameters are verified as indicated by an affirmative outcome, the process includes performing transition operations as shown at process block 1906 based at least partially on the data read from the IPW memory system. Ultimately, transfer phase operations are completed as indicated at process block 1907 and the process terminates.

If the launch-specific parameters obtained directly or indirectly from the read process block 1902 are not verified as indicated by a negative outcome at decision box 1904, the process branches to determine if there has been a maximum number of read attempts. If the maximum number of read attempts has not been reached, the process branches from decision box 1910 to make another read attempt at process block 1902. However, if a maximum number of read attempts has been reached is indicated by an affirmative outcome at decision box 1910, the process proceeds to perform recovery operations as indicated at 1912. These recovery operations may include attempting alternate procedures for determining data which affects autonomous control. For example, the satellite may autonomously attempt to determine position from a star tracker system and/or autonomously eliminate or reduce spin to facilitate position determination with onboard sensors and instruments. Should the recovery operations be successful, the process completes transfer operations with the satellite in the desired on station condition as indicated at process block 1907.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. An artificial satellite comprising:
a satellite structure;
an onboard control system for controlling a plurality of satellite components; and
a memory system, the memory system physically coupled to the satellite structure and independently powerable with respect to the onboard control system and thereby operable to at least receive and store information even when the onboard control system is in an OFF state, the memory system (i) arranged to communicatively couple with the onboard control system, and (ii) stores data which specifies one or more launch-specific parameters for configuring at least one of the satellite components,
the onboard control system being adapted to operate in a transfer phase in response to the artificial satellite separating from a payload dispenser, the onboard control system further adapted to autonomously control, while operating in the transfer phase, one or more aspects of the at least one satellite component at least partly based on the data.

2. The artificial satellite of claim 1 further comprising a data exchange interface on a peripheral section of the artificial satellite, the data exchange interface for communicating with an external communication device.

3. The artificial satellite of claim 2 wherein the memory system is further arranged to communicatively couple with the external communication device via the data exchange interface.

4. The artificial satellite of claim 2 wherein the data exchange interface includes an inter-satellite communication link, and the memory system is communicatively coupled to the inter-satellite communication link.

5. The artificial satellite of claim 1, wherein the onboard control system is adapted to cause, while operating in the transfer phase, the memory system to transmit the launch-specific parameters.

6. The artificial satellite of claim 1 wherein the onboard control system, while operating in the transfer phase, is adapted to autonomously control a physical orientation of the at least one satellite component at least partly based on the data.

7. The artificial satellite of claim 1 wherein the onboard control system, while operating in the transfer phase, is adapted to autonomously control a physical orientation of the artificial satellite at least partly based on the data.

8. The artificial satellite of claim 1 wherein the onboard control system, while operating in the transfer phase, is adapted to autonomously perform time-contingent transfer phase functionalities at least partly based on a time value directly or indirectly specified by the data.

9. The artificial satellite of claim 1 wherein the launch-specific parameters include time parameters of different temporal resolutions.

10. The artificial satellite of claim 1 wherein the satellite structure includes at least one of a structural wall, a structural bracket, a structural rib, and, a circuit substrate, and a cable.

11. The artificial satellite of claim 1 wherein the plurality of satellite components includes at least one of a solar array, an antenna, a magnetorquer, a propulsion thruster, an actuator, and a reprogrammable controller.

12. The artificial satellite of claim 1 wherein the launch-specific parameters characterize at least one of a target antenna orientation, a target solar-array orientation, a target satellite attitude, a satellite launch orientation, a predicted satellite spin rate, a predicted satellite spin axis orientation, a satellite launch position on the payload dispenser, a satellite separation time from the payload dispenser, a satellite relative separation order from the payload dispenser, a target orbital state vector, a target semi-major axis, a target eccentricity, a target right ascension of ascending mode, a target argument of perigee, a target orbit, a target orbital plane, a target orbital position in the target orbital plane, a launch date, and a launch time.

13. The artificial satellite of claim 1 wherein the memory system comprises a first computer-readable memory that is communicatively coupled to a first antenna that is arranged at a first location, the first computer-readable memory storing at least the launch-specific parameters, and the onboard control system comprises a second antenna for communicatively coupling with the memory system through the first antenna, the second antenna arranged at a second location, the first and second antennas arranged within an operative communication distance from each other.

14. The artificial satellite of claim 13 wherein the second antenna is located on a section of a circuit substrate of the onboard control system.

15. The artificial satellite of claim 13 wherein the second antenna is arranged in or on a portion of an integrated circuit package of a controller included in the onboard control system.

16. The artificial satellite of claim 13 wherein the onboard control system is adapted to wirelessly power the memory system.

17. The artificial satellite of claim 13 wherein the artificial satellite comprises a wall that defines a peripheral boundary of the artificial satellite, and the distance between a first portion of the wall and the first antenna is arranged within the operative communication distance such that a data writing device can wirelessly communicate with the memory system when an antenna of the data writing device is positioned at the first portion of the wall.

18. The artificial satellite of claim 13 wherein the first computer-readable memory is arranged at a first side of the satellite structure and the first antenna is arranged at a second side of the satellite structure, the first and second sides differing.

19. The artificial satellite of claim 18 wherein the second side is an exterior-facing side of the artificial satellite and the first side is an interior-facing side of the artificial satellite.

20. A method of deploying an artificial satellite, the method comprising:
arranging the artificial satellite in a stowed position on a satellite deployment system, the artificial satellite being in a launch condition in which an onboard control system of the artificial satellite is in an off state;
with the artificial satellite in the stowed position and launch condition, communicatively coupling to a memory system of the artificial satellite, the memory system being powered independently of the onboard control system; and
with the artificial satellite in the stowed position and launch condition, writing to the memory system of the artificial satellite data which specifies one or more launch-specific parameters for configuring at least one component of the artificial satellite.

* * * * *